US008449375B2

(12) United States Patent
Oberberger

(10) Patent No.: US 8,449,375 B2
(45) Date of Patent: May 28, 2013

(54) GAMING MACHINE AND METHOD PROVIDING A MULTI-PLAY HIGH-LOW GAME

(75) Inventor: Michael M. Oberberger, Reno, NV (US)

(73) Assignee: IGT, Reno, NV (US)

( * ) Notice: Subject to any disclaimer, the term of this patent is extended or adjusted under 35 U.S.C. 154(b) by 1438 days.

(21) Appl. No.: 11/557,848

(22) Filed: Nov. 8, 2006

(65) Prior Publication Data

US 2008/0108436 A1 May 8, 2008

(51) Int. Cl.
*A63F 13/00* (2006.01)

(52) U.S. Cl.
USPC .................................. 463/20; 463/10; 463/11

(58) Field of Classification Search
USPC ......................................... 463/10–13, 20, 42
See application file for complete search history.

(56) References Cited

U.S. PATENT DOCUMENTS 2,545,644 A 3/1951 Denton et al.
3,825,255 A 7/1974 Kennard et al.
4,410,178 A 10/1983 Partridge
4,448,419 A 5/1984 Telnaes
4,624,459 A 11/1986 Kaufman
4,836,546 A 6/1989 Di Re et al.
4,840,382 A 6/1989 Rubin
4,852,324 A 8/1989 Page
5,072,946 A 12/1991 Miller
5,154,420 A 10/1992 Gutknecht
5,324,041 A 6/1994 Boylan et al.
5,344,145 A 9/1994 Chadwick et al.
5,362,052 A 11/1994 Kubatsch
5,490,670 A 2/1996 Hobert
5,524,888 A 6/1996 Heidel (Continued)

FOREIGN PATENT DOCUMENTS

EP 0 945 837 9/1999
GB 2 214 389 8/1989

(Continued)

OTHER PUBLICATIONS

"Sports Betting, Online Betting Gambling odds and more at Sportsbook.com" (http://web.archive.org/web/20051210171541/www.sportsbook.com/misc/odds.php#progressive), created on Dec. 10, 2005, accessed on Nov. 23, 2010.*

(Continued)

*Primary Examiner* — Arthur O. Hall
*Assistant Examiner* — Allen Chan
(74) *Attorney, Agent, or Firm* — Neal, Gerber & Eisenberg LLP

(57) ABSTRACT

A gaming machine and method having a high-low game including a plurality of ranked symbols. The gaming machine enables the player to select a number of ranked symbols to play in the game and to make a wager. The gaming machine displays the number of ranked symbols. For each of the displayed ranked symbols, the gaming machine associates another one of the ranked symbols, a comparison symbol, with the displayed ranked symbol and enables the player to make an input to indicate whether the comparison symbol will be of a higher rank or a lower rank than the displayed ranked symbol. After the player makes the input, the gaming machine generates the comparison symbol and determines if the player's input was correct. The gaming machine provides an award to the player if the player makes a predetermined number of correct inputs.

32 Claims, 20 Drawing Sheets

U.S. PATENT DOCUMENTS

| | | | |
|---|---|---|---|
| 5,647,798 | A | 7/1997 | Falciglia |
| 5,664,999 | A | 9/1997 | Kurihara |
| 5,813,673 | A | 9/1998 | Richardson |
| 5,855,514 | A | 1/1999 | Kamille |
| 5,885,157 | A | 3/1999 | Harada et al. |
| 5,895,047 | A | 4/1999 | Callahan |
| 5,928,081 | A | 7/1999 | Bochichio et al. |
| 5,954,336 | A | 9/1999 | Goossens et al. |
| 5,964,463 | A | 10/1999 | Moore, Jr. |
| 5,988,643 | A | 11/1999 | Awada |
| 6,015,346 | A | 1/2000 | Bennett |
| 6,033,307 | A | 3/2000 | Vancura |
| 6,089,976 | A | 7/2000 | Schneider et al. |
| 6,102,403 | A | 8/2000 | Kaufman |
| 6,102,798 | A | 8/2000 | Bennett |
| 6,120,377 | A | 9/2000 | McGinnis, Sr. et al. |
| 6,135,882 | A | 10/2000 | Kadlic |
| 6,142,874 | A | 11/2000 | Kodachi et al. |
| 6,142,875 | A | 11/2000 | Kodachi et al. |
| 6,146,271 | A | 11/2000 | Kadlic |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,168,523 | B1 | 1/2001 | Piechowiak et al. |
| 6,173,955 | B1 | 1/2001 | Perrie et al. |
| 6,174,235 | B1 | 1/2001 | Walker et al. |
| 6,179,711 | B1 | 1/2001 | Yoseloff |
| 6,190,255 | B1 | 2/2001 | Thomas et al. |
| 6,203,429 | B1 | 3/2001 | Demar et al. |
| 6,213,876 | B1 | 4/2001 | Moore, Jr. |
| 6,224,483 | B1 | 5/2001 | Mayeroff |
| 6,231,442 | B1 | 5/2001 | Mayeroff |
| 6,270,411 | B1 | 8/2001 | Gura et al. |
| 6,296,568 | B1 | 10/2001 | Tracy |
| 6,305,686 | B1 | 10/2001 | Perrie et al. |
| 6,309,300 | B1 | 10/2001 | Glavich |
| 6,312,334 | B1 | 11/2001 | Yoseloff |
| 6,315,660 | B1 | 11/2001 | DeMar et al. |
| 6,315,664 | B1 | 11/2001 | Baerlocher et al. |
| 6,322,309 | B1 | 11/2001 | Thomas et al. |
| 6,336,860 | B1 | 1/2002 | Webb |
| 6,398,220 | B1 | 6/2002 | Inoue |
| 6,419,579 | B1 | 7/2002 | Bennett |
| 6,425,824 | B1 | 7/2002 | Baerlocher |
| 6,439,995 | B1 | 8/2002 | Hughs-Baird et al. |
| 6,461,241 | B1 | 10/2002 | Webb et al. |
| 6,481,713 | B2 | 11/2002 | Perrie et al. |
| 6,506,118 | B1 | 1/2003 | Baerlocher et al. |
| 6,511,375 | B1 | 1/2003 | Kaminkow |
| 6,514,141 | B1 | 2/2003 | Kaminkow et al. |
| 6,565,084 | B1 | 5/2003 | Katz et al. |
| 6,585,588 | B2 | 7/2003 | Hartl |
| 6,585,591 | B1 | 7/2003 | Baerlocher |
| 6,595,854 | B2 | 7/2003 | Hughs-Baird et al. |
| 6,599,185 | B1 | 7/2003 | Kaminkow |
| 6,602,135 | B1 | 8/2003 | Gerrard |
| 6,604,740 | B1 | 8/2003 | Singer et al. |
| 6,616,142 | B2 | 9/2003 | Adams |
| 6,634,943 | B1 | 10/2003 | Baerlocher |
| 6,648,756 | B2 | 11/2003 | Moody |
| 6,688,977 | B1 | 2/2004 | Baerlocher |
| 6,722,983 | B2 | 4/2004 | Kaminkow et al. |
| 6,746,328 | B2 | 6/2004 | Cannon et al. |
| 6,749,502 | B2 | 6/2004 | Baerlocher |
| 6,761,353 | B2 | 7/2004 | Berman et al. |
| 6,780,107 | B2 | 8/2004 | Baerlocher et al. |
| 6,802,775 | B2 | 10/2004 | Baerlocher et al. |
| 6,808,174 | B1 | 10/2004 | Rubin |
| 6,811,483 | B1 | 11/2004 | Webb et al. |
| 6,817,943 | B2 | 11/2004 | Gerrard |
| 6,840,856 | B2 | 1/2005 | Stern |
| 6,863,607 | B2 | 3/2005 | Gerrard |
| 6,887,152 | B2 * | 5/2005 | Stanek ............................ 463/17 |
| 7,159,869 | B2 | 1/2007 | Pastirik |
| 7,361,087 | B2 | 4/2008 | Baerlocher et al. |
| 2002/0135129 | A1 | 9/2002 | Tarantino |
| 2002/0187827 | A1 | 12/2002 | Blankstein |
| 2003/0104852 | A1 | 6/2003 | Duhamel |
| 2003/0153378 | A1 | 8/2003 | Schlegel et al. |
| 2005/0032565 | A1 | 2/2005 | Cheng et al. |
| 2005/0054411 | A1 | 3/2005 | Hughs-Baird et al. |
| 2005/0059448 | A1 | 3/2005 | Sims et al. |
| 2006/0108735 | A1 * | 5/2006 | Pastirik ......................... 273/274 |

FOREIGN PATENT DOCUMENTS

| | | |
|---|---|---|
| GB | 2 262 642 | 6/1993 |
| GB | 2 305 531 | 4/1997 |
| GB | 2 387 010 | 10/2003 |
| GB | 2 393 022 | 3/2004 |
| GB | 2 393 311 | 3/2004 |
| WO | WO 82/01611 | 5/1982 |
| WO | WO 85/03158 | 7/1985 |
| WO | WO 97/27569 | 7/1997 |
| WO | WO 00/12186 | 3/2000 |
| WO | WO 02/066127 | 8/2002 |

OTHER PUBLICATIONS

A Fistful of Dollars Article, http://www.minnesotagaming.com (website), printed on Jun. 18, 2007, available prior to Nov. 8, 2006.

Beer Game: High-Low Game Description, http://realbeer.com (website), printed on May 3, 2001.

Card Sharks Article, http://grochowskicasinocitytimes.com (website), printed on Jun. 18, 2007, available prior to Nov. 8, 2006.

Double Up Poker Game Description, written by IGT, available prior to Nov. 8, 2006.

High Low Card Game Description, http://www.geocities.com (website), printed on Aug. 2, 2004.

High-Low Card Game Description, http://math.hws.edu (website), printed on Aug. 2, 2004.

How to Play—Roll & Win Instructions, written by WMS Gaming, wmsgaming.com (website), printed on Aug. 29, 2001.

In Between Game Description, written by IGT, available prior to Nov. 8, 2006.

Introducing the "Smiling Ape" Machine Advertisement, written by IGT, published prior to Nov. 8, 2006.

Kismet Advertisement, written by Atronic Casino Technology Ltd., published in 2004.

Price is Right Hi-Lo Article, http://gscentral.net/hilo.htm (website), printed on Jul. 30, 2004.

* cited by examiner

GAMING MACHINE AND METHOD PROVIDING A MULTI-PLAY HIGH-LOW GAME

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming devices provide enjoyment and excitement to players, in part, because they may ultimately lead to a monetary award for the player. Gaming devices also provide enjoyment and excitement to players because they are fun to play. Gaming machines which provide players awards in primary or base games are well known. Gaming machines generally require a player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards. Bonus or secondary games are also well known. Bonus or secondary games provide gaming device manufacturers with an opportunity to provide additional enjoyment and excitement to players. Bonus games provide extra awards to the player and enable the player to play a game that is different than the base game.

One known game requiring players to think and decide before making a selection, the success of which is decided by a random selection, is the game of high-low. High-low is normally played with a conventional deck of cards. Different forms of this game exist, but they each include a common component; namely, the player is shown at least one card and must guess whether the next card is higher.

Certain video poker machines include a double up feature or game when the player wins in a primary game. The double up feature offers the player a chance to double the award or credits won by the player from the player's winning hand or primary game. A variety of presentations have been utilized to provide the double up feature.

In one presentation, one card from a standard deck of cards is displayed face up and four cards are displayed face down. The player must choose a single face down card which the player guesses to be higher than the face up card. A correct choice doubles the player's previous win and provides the player another chance to double the player's win or collect the player's prior winnings are lost. In another version, a choice lower than the face up card results in a replay of the double up game.

Another presentation asks the player to select whether a face down card from a standard deck of cards will be red or black. A correct choice doubles the player's previous winnings. An incorrect choice ends the double up game and the player's prior winnings are lost.

In another presentation, the player and dealer each receive a card from a standard deck of cards. If the player's card beats the dealer's card, the player obtains double the award. If the dealer's card beats the player's card, the player's prior winnings are lost. If there is a tie, the deal is repeated.

In another presentation, the player selects or is dealt a card. If the card is low (e.g., 2 to 7) the player loses the player's prior winnings. If the card is high (e.g., 9 to Ace) the player's prior winnings are doubled. If the card is an intermediate care (e.g., 8) the player loses or the double up game is repeated.

High-low card games are fun, exciting, simple, interactive and involve mathematical thought. Accordingly, new and different high-low games can make an entertaining primary or bonus game for a wagering gaming device. A continuing need exists to provide gaming devices that issue awards in an exciting and enjoyable manner.

SUMMARY

The present disclosure relates in general to a gaming machine and method, and more particularly to a gaming machine and method providing a high-low game. In one embodiment, the gaming machine includes a game including a plurality of ranked symbols such as numbers. The ranked symbols may be any suitable type of symbols. The gaming machine includes at least one display device and at least one input device. The gaming machine enables the player to select a number of ranked symbols to play in the game and to make a wager. The gaming machine randomly selects a quantity of the ranked symbols equal to the number of ranked symbols selected to be played by the player from all of the ranked symbols. For each of the quantity of ranked symbols, the gaming machine provides or associates another one of the ranked symbols (i.e., a comparison symbol), with the displayed ranked symbol without showing the comparison symbol to the player. The gaming device enables the player to make an input to indicate whether the comparison symbol will be of a higher rank or a lower rank than the displayed ranked symbol. That is, the gaming machine enables the player to guess whether the comparison symbol is higher in rank or lower in rank than the initially displayed ranked symbol. After the player makes the input, the gaming machine generates and displays the comparison symbol and determines if the comparison symbol is of a higher rank or a lower rank than the displayed ranked symbol. The gaming machine determines if the player's input or guess was correct. After this process is repeated for each of the quantity of the ranked symbols, the gaming machine provides an award to the player if the player makes a predetermined number of correct inputs. It should be appreciated that the gaming machine may determine or generate the comparison symbol for each displayed symbol before or after the player makes an input for the respective displayed symbol.

In one embodiment, the game includes cards and a plurality or all of the cards include a rank in the form of a numerical value. The gaming machine enables the player to select a number of cards to play in a high-low game. In one embodiment, the gaming machine provides a range of numbers of cards the player may select from. In one embodiment, the number of cards is at least two but is lower than or equal to a maximum number. The gaming machine also enables the player to select an amount to wager on each of the selected cards. For example, the player chooses to play ten cards in the game and wagers two credits on each card. The gaming machine then displays each of the ten cards to the player face-up. That is, the gaming machine enables the player to see the values of each of the displayed selected number of cards. For each selected displayed card, the gaming machine enables the player to make an input to choose whether the numerical value of the comparison card for that displayed card is higher in value or lower in value than the numerical value of the displayed card. For example, a first selected card displays a value of ten. The player makes an input to choose that the comparison card has a numerical value lower in value than the value of ten. The gaming machine then "turns over" or reveals the comparison card so that the player may view the numerical value of the comparison card. The gaming machine indicates whether the player is correct or incorrect. This is repeated for each of the remaining nine cards. In one embodiment, each of the cards of the deck of cards can only be used once in a conventional manner. Therefore, the probability of the player guessing correctly is affected by the player's knowledge of the cards displayed and comparison cards revealed as the game progresses. This may provide a player an advantage in certain situations.

After each card has been played, the gaming machine determines any award for the player based on how many cards the player selected to play and how many correct inputs the player made. In one embodiment, the gaming machine determines an award for a player based on a paytable. For example, if the player wagers on ten symbols and wagers two credits per symbol: (a) if the player gets seven inputs correct, the gaming machine pays the player 20 credits and the player recoups the wagered amount; (b) if the player gets eight inputs correct, the gaming machine pays the player 27 credits; (c) if the player gets nine inputs correct, the gaming machine pays the player 33 credits; and (d) if the player gets ten inputs correct, the gaming machine pays the player 55 credits.

It should be appreciated that the ranked symbols selected by the player may be displayed in any suitable manner. In one embodiment, at the beginning of the game, the gaming machine displays each of the selected number of the ranked symbols to the player. In another embodiment, the gaming machine sequentially displays the selected number of the ranked symbols to the player. For example, the player selects to play three cards. The gaming machine displays or reveals the first of the three cards to the player and enables the player to make an input for the first card to guess whether another comparison card is higher or lower in value than the value of the first card. The gaming machine displays the value of the comparison card. The gaming machine then displays the value of the second of the three cards.

It should be appreciated that the gaming machine may determine the award in any suitable manner. In one embodiment, the gaming machine bases the award on the number of correct guesses made by the player. For example, in a five symbol game, the player must guess correctly four or five times to receive an award. For example, if a player wagers 2 credits per symbol and guesses correctly four times, the player receives an award of 10 credits and if the player guesses correctly five times, the player receives an award of 13 credits. However, if the player correctly guesses zero, one, two or three times, the player does not win an award. In one such embodiment, the awards are exponential or non-linear. That is, instead of an award amount doubling for every correct answer, in one embodiment, the award exponentially increases after the player makes a certain number of correct inputs. In one embodiment, the gaming machine bases the award on the number of incorrect guesses made by the player. For example, in a five symbol game, the player must guess incorrectly four or five times to receive an award. In an alternative embodiment, the gaming machine determines the award individually for each card. Generally, if the player makes more predictions, more awards will be available for the player to win. The size of the plurality of awards can also vary with the amount of the player's wager. The more the player wagers, the greater the size of the available award.

In an alternative embodiment, if the player makes a certain number of incorrect guesses and can no longer win the game, the game terminates. For example, in one embodiment, if the player wagers on six cards and the player only wins if the player makes five or six correct inputs, after the player makes two incorrect inputs the game terminates. That is, once the player is not longer able to win the game, the gaming machine terminates the game. In another embodiment, even if the player is not able to win the game, the gaming machine continues the game until the number of wagered on symbols have been played.

The present disclosure provides an advantage in offering the player a choice in selecting the number of symbols to play. That is, prior to offering a variable number of predictions, the player did not have a choice in selecting the number of predictions to make. The game of the present disclosure thus enables the player to select a desired number of predictions, up to a designated number of predictions. To accommodate predictions up to the designated number of predictions, the gaming device varies the number of available awards and the size of the available awards in the paytable for the game.

It should also be appreciated that a further advantage of the game of the present disclosure is to enable a variable amount of player predictions in a game. The gaming device enables the player to select the amount of predictions the player is able to make in a game. Since the symbols used in the prediction game are generated from a predetermined set of symbols, this potentially enables the player to make logical predictions in the game. As the player makes more predictions in a game, more symbols from the predetermined set of symbols are revealed. The remaining unrevealed symbols are reduced for every prediction the player makes. The player can then attempt to better predict the likelihood of the comparison symbol being higher or lower than the remaining player symbol(s). Thus, the player is able to control the amount of skill the player can apply to the game.

Other objects, features and advantages of the disclosure will be apparent from the following detailed disclosure, taken in conjunction with the accompanying sheets of drawings, wherein like numerals refer to like parts, elements, components, steps and processes.

DETAILED DESCRIPTION OF THE INVENTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
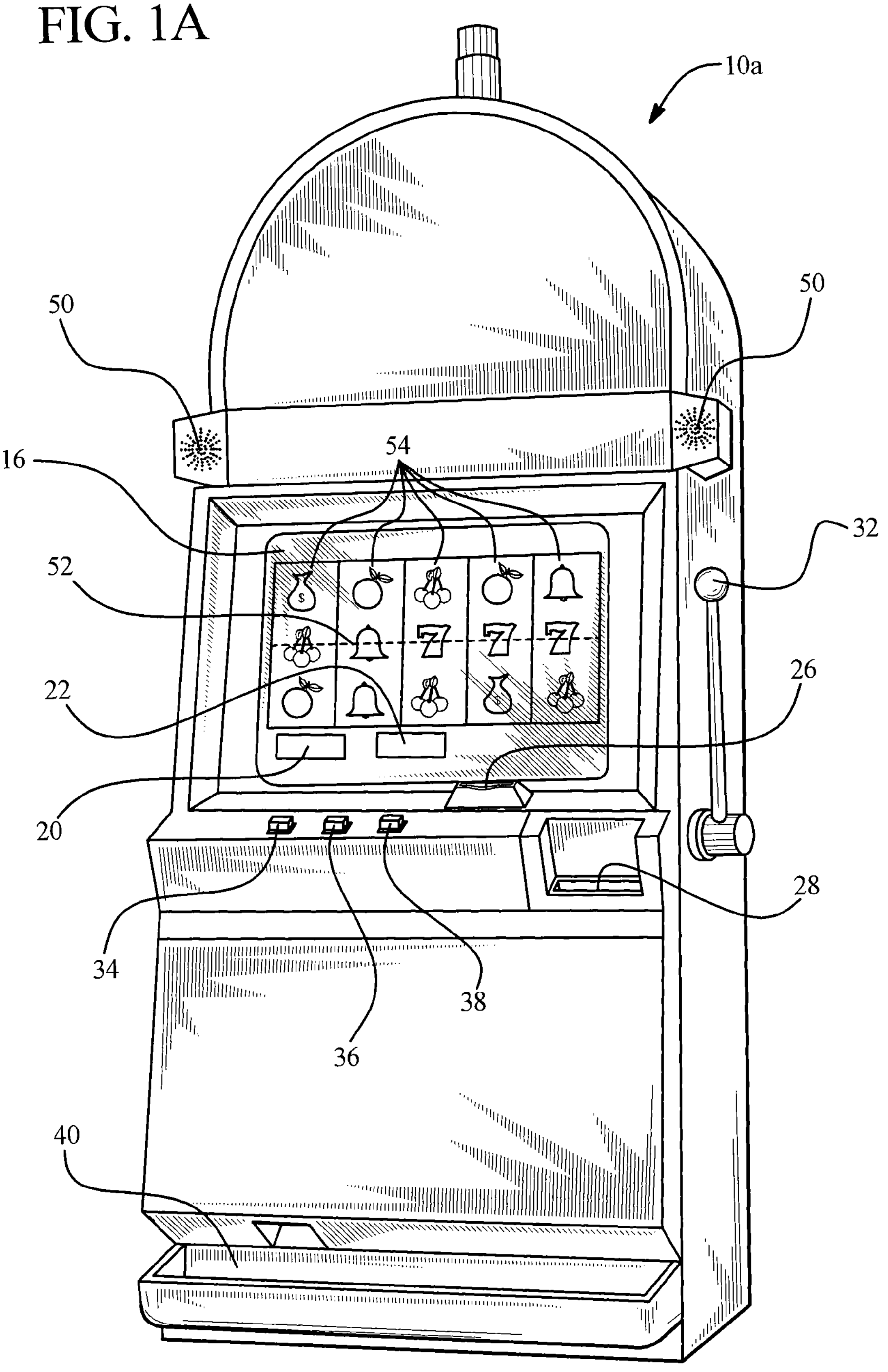
FIGS. 1A and 1B are perspective views of alternative embodiments of the gaming devices of the present disclosure.
Figure 1B:
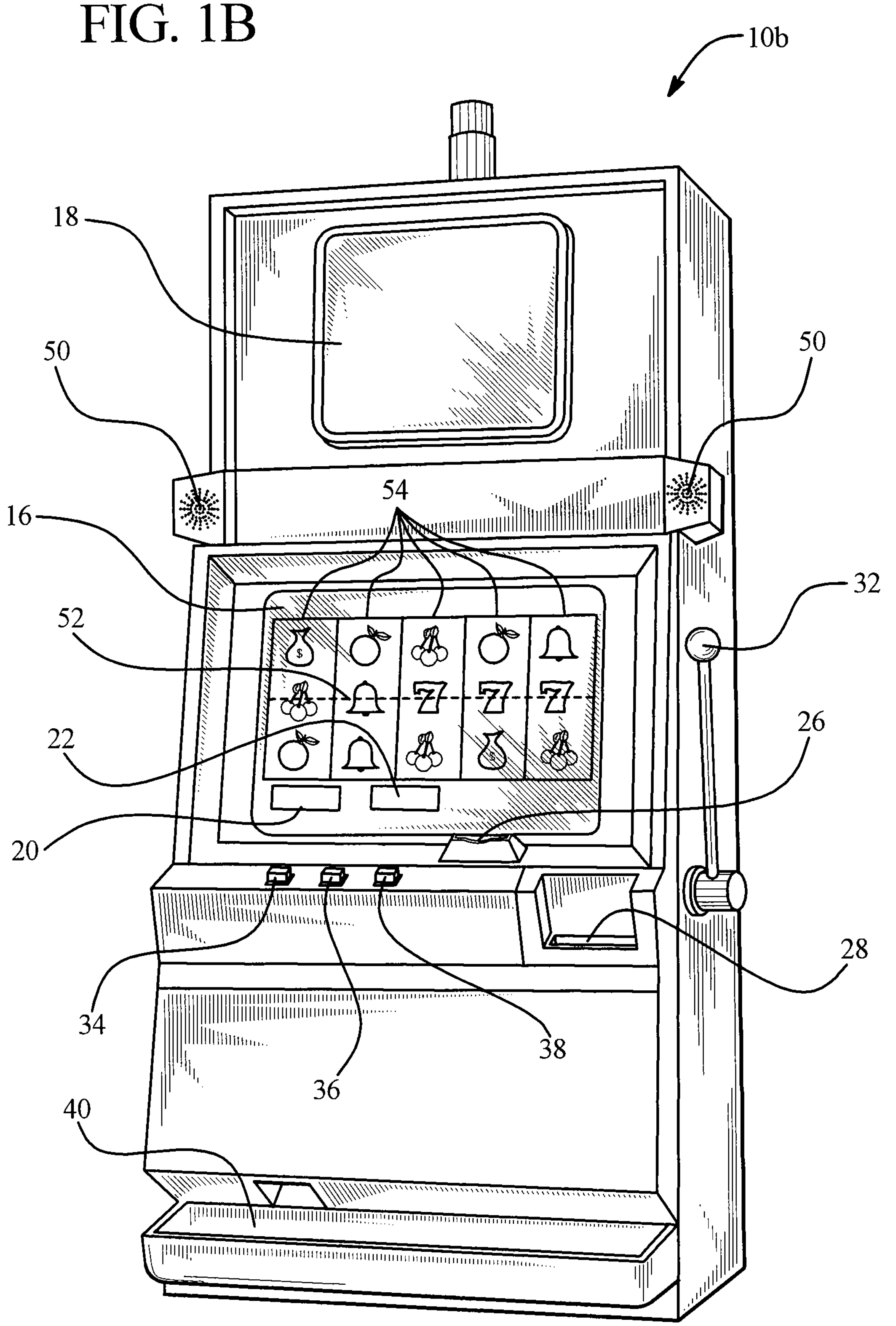

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
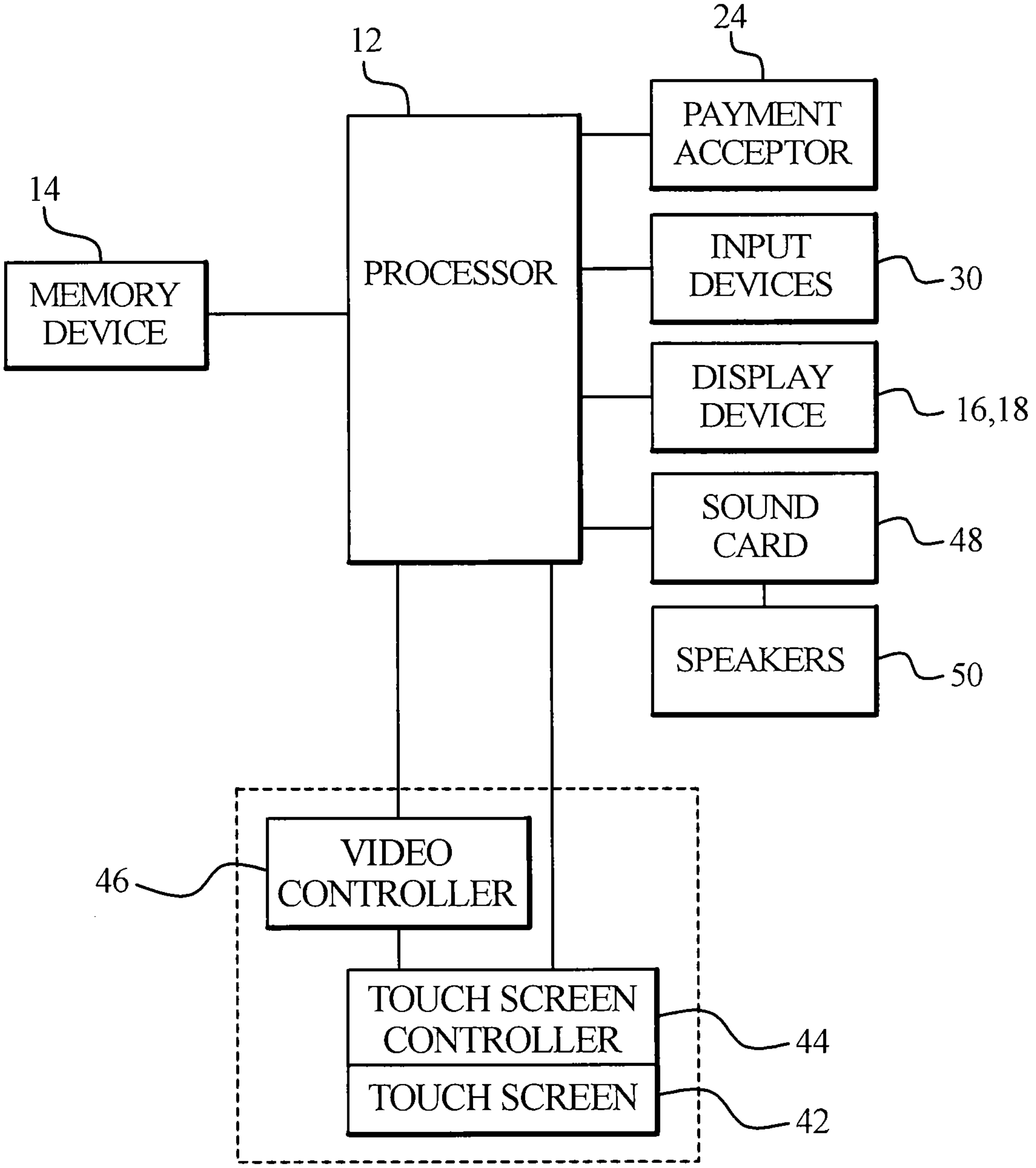
FIG. 2A is a schematic block diagram of the electronic configuration of one embodiment of the gaming devices of the present disclosure.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

It should be appreciated that the game of the present disclosure may be incorporated as a primary and/or bonus game. Gaming device 10 can incorporate any additional suitable wagering primary or base game and/or bonus or secondary game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
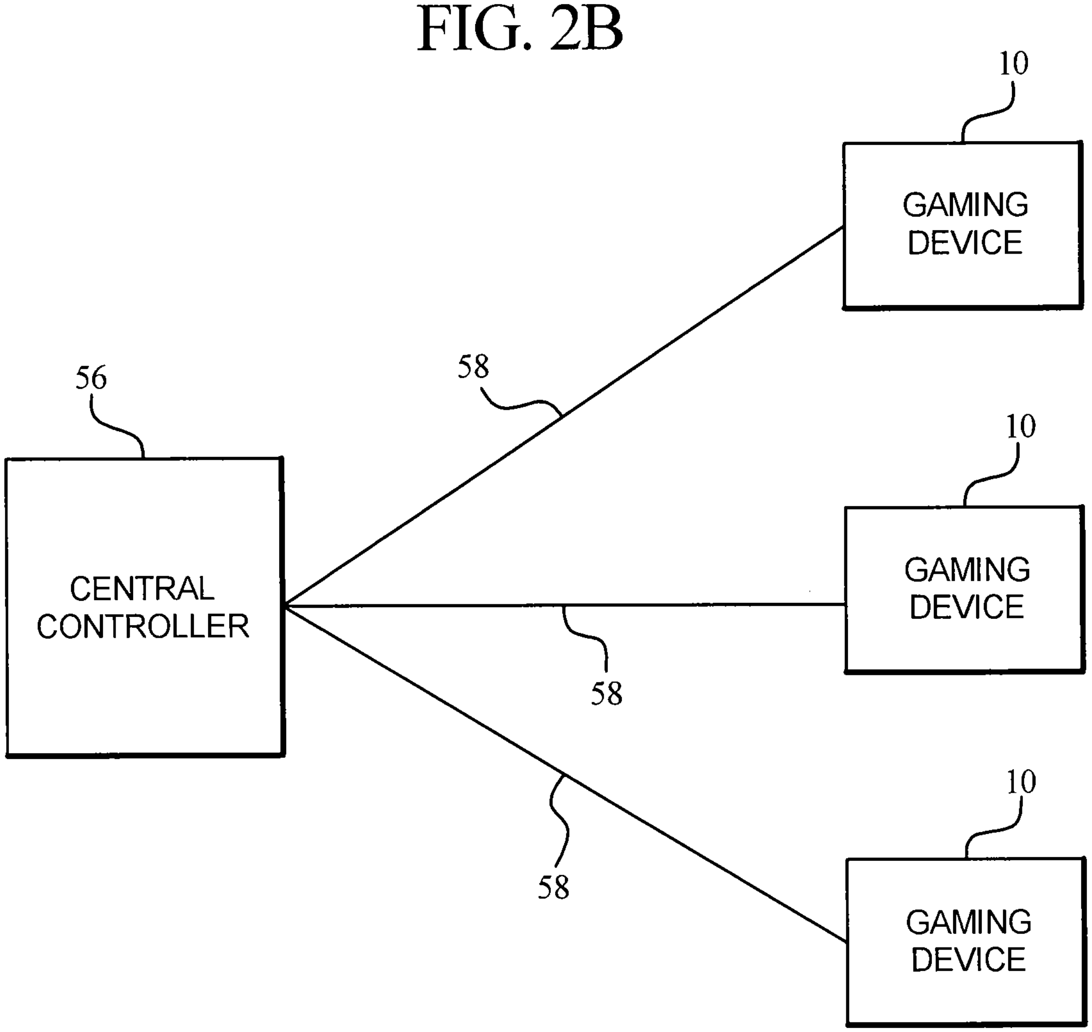
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used.

Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

High-Low Multi Play Game

Figure 3:
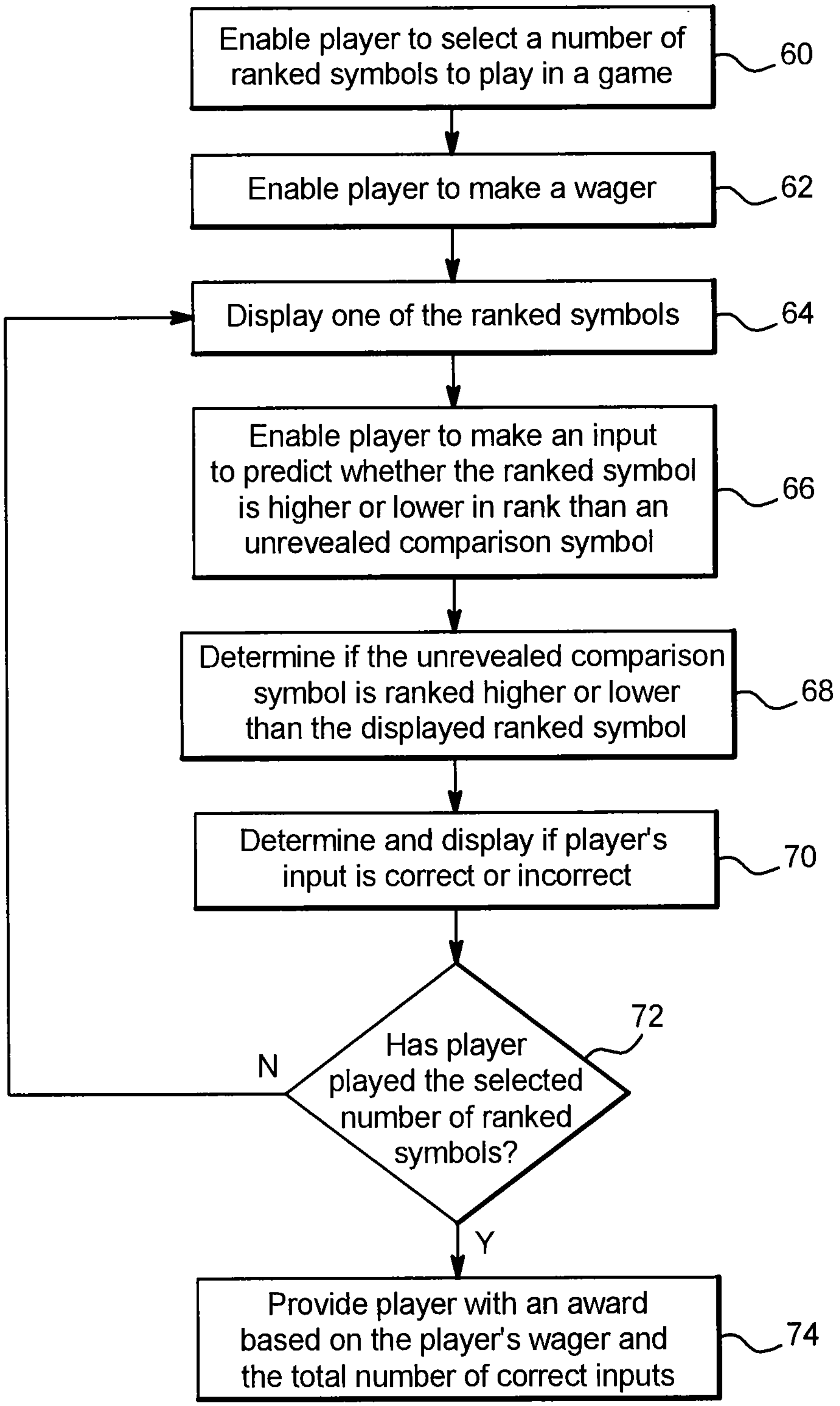
FIG. 3 is a flow chart of one method of one embodiment of the game of the present disclosure.

FIG. 3 illustrates one embodiment of one method of the high-low game disclosed herein. As illustrated in FIG. 3, a gaming machine enables a player to select a number of ranked symbols to play in a game as illustrated in block 60. The gaming machine enables the player to make a wager as illustrated in block 62. The gaming machine displays one of the ranked symbols to the player as illustrated in block 64. The gaming machine enables the player to make an input to predict whether the ranked symbol is higher or lower in rank than an unrevealed ranked symbol or an unrevealed comparison symbol as illustrated in block 66. The gaming machine determines if the unrevealed comparison symbol is ranked higher or lower than the displayed ranked symbol as illustrated in block 68. In one embodiment, the gaming machine generates the unrevealed comparison symbol before enabling the player to make the input. In another embodiment, the gaming machine generates the unrevealed comparison symbol after enabling the player to make the input. The gaming machine determines if the player's input is correct or incorrect and displays this determination to the player as illustrated in block 70. It should be appreciated that the gaming machine may inform the player of the input being correct or incorrect in any suitable manner. In one embodiment, the gaming machine displays or reveals the unrevealed comparison symbol to the player. In another embodiment, the gaming machine does not display or reveal the unrevealed comparison symbol to the player.

The gaming machine determines if the player has played the selected number of ranked symbols as illustrated in diamond 72. If the player has not played the selected number of ranked symbols, the gaming machine repeats the process of displaying the ranked symbol, enabling the player to make an input and determining if the player's input was correct or incorrect until the selected number of ranked symbols have been played. If the player has played the selected number of ranked symbols, the gaming machine determines a game outcome for the player and provides the player with a game outcome based on the player's wager and the total number of correct inputs as illustrated in block 74. In one embodiment, the player must make a predetermined correct number of inputs to receive an award and the award greatly increases for each correct choice made after the predetermined number.

Figure 4A:
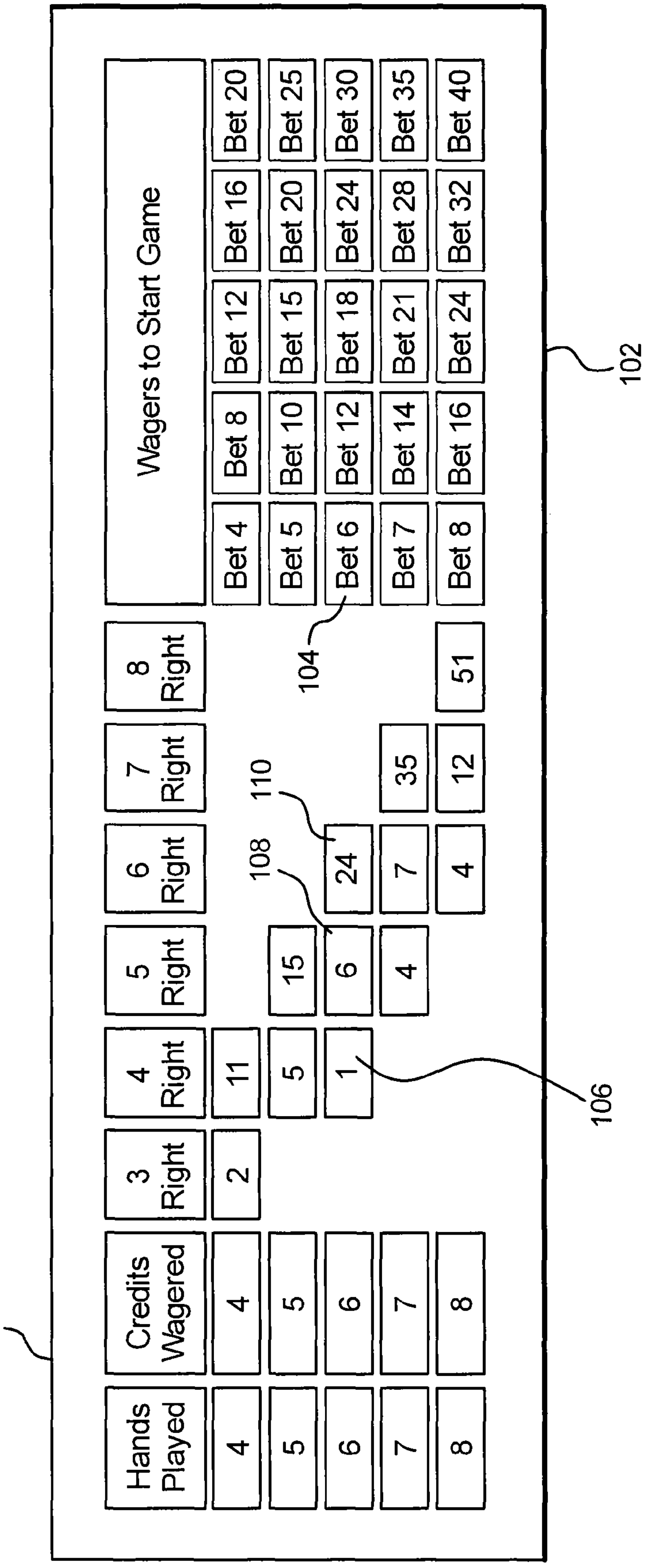
FIGS. 4A, 4B, 4C, 4D, 4E, 4F, 4G and 4H are enlarged views of a display device of a gaming machine enabling the player to play one embodiment of the game of the present disclosure.

FIGS. 4A, 4B, 4C, 4D, 4E, 4F, 4G and 4H illustrate an enlarged view of a display device enabling the player to play one embodiment of the high-low game. In one embodiment, the gaming machine provides the player instructions on how to play the high-low game. In one embodiment, the ranked symbols are displayed using cards of a conventional deck of 52 playing cards. In alternative embodiments, the cards may include one or more wild card or Joker, modifier cards or any other suitable alternative function cards. In one embodiment, the cards are a deck of cards where each card can only be used once in a single game. The gaming machine enables a player to choose a number of displayed symbols, hands or number of cards to play. As illustrated in FIG. 4A, the gaming machine enables the player to select between 4 and 8 hands and to wager between 1 and 5 credits per each hand.

FIG. 4A illustrates one embodiment of a paytable and a selection screen of the game. The paytable includes a plurality of different numbers of symbols or hands on the left side of the table. The right side of the paytable includes a plurality of wagers in a touch screen format, wherein the gaming machine enables the player to select the number of symbols or hands and a number of credits to wager on each symbol or hand. For example, if the player wants to wager on six symbols or hands and wants to wager one credit per symbol or hand the player selects the bet 6 button 104. If the player then makes four correct inputs, the player will receive one credit, as illustrated by the one credit square 106. If the player makes five correct inputs, the player will receive six credits, as illustrated by the six credit square 108. If the player makes six correct inputs, the player will receive 24 credits, as illustrated by the 24 credit square 110. In one embodiment, if the player wagers more than one credit per symbol or hand, the gaming machine multiplies the number of credits by the number of credits wagered on each symbol or hand. That is, the payback in the paytable is multiplied by the number of credits wagered per symbol or hand. For example, if the player chose to wager 30 credits on six symbols or hands, the player would therefore be choosing to wager five credits a symbol or hand. If the player got all six symbols or hands correct, the player would win 125 (24×5). In the illustrated embodiment, the awards increase greatly or exponentially for each correct answer by the player for certain numbers of correct inputs. For example, if the player wagers on four hands and gets three correct, the player wins two credits. However, if the player gets all four correct, the player wins eleven credits.

Figure 4B:
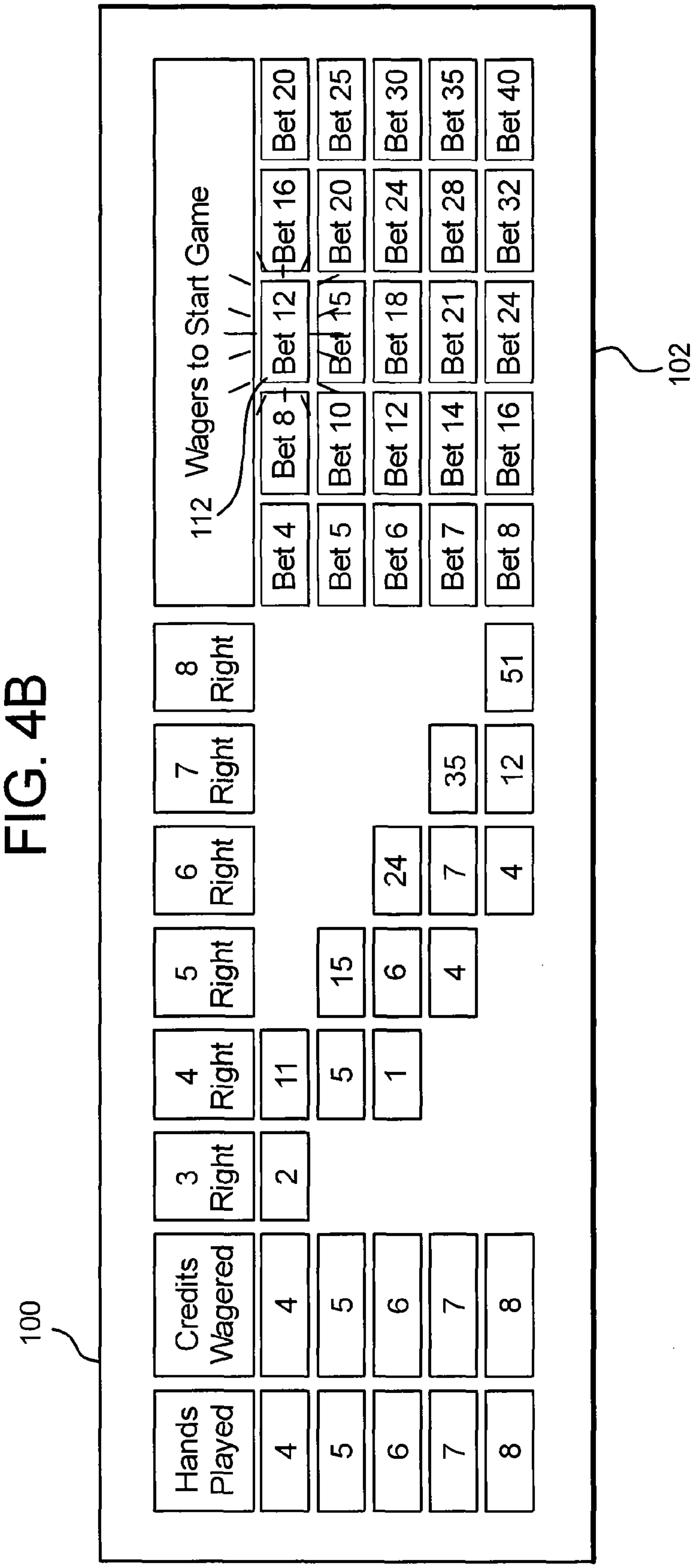

As illustrated in FIG. 4B, the player makes an input to play four hands and wager a total of 12 credits or three credits per hand by selecting the bet 12 button 112.

Figure 4C:
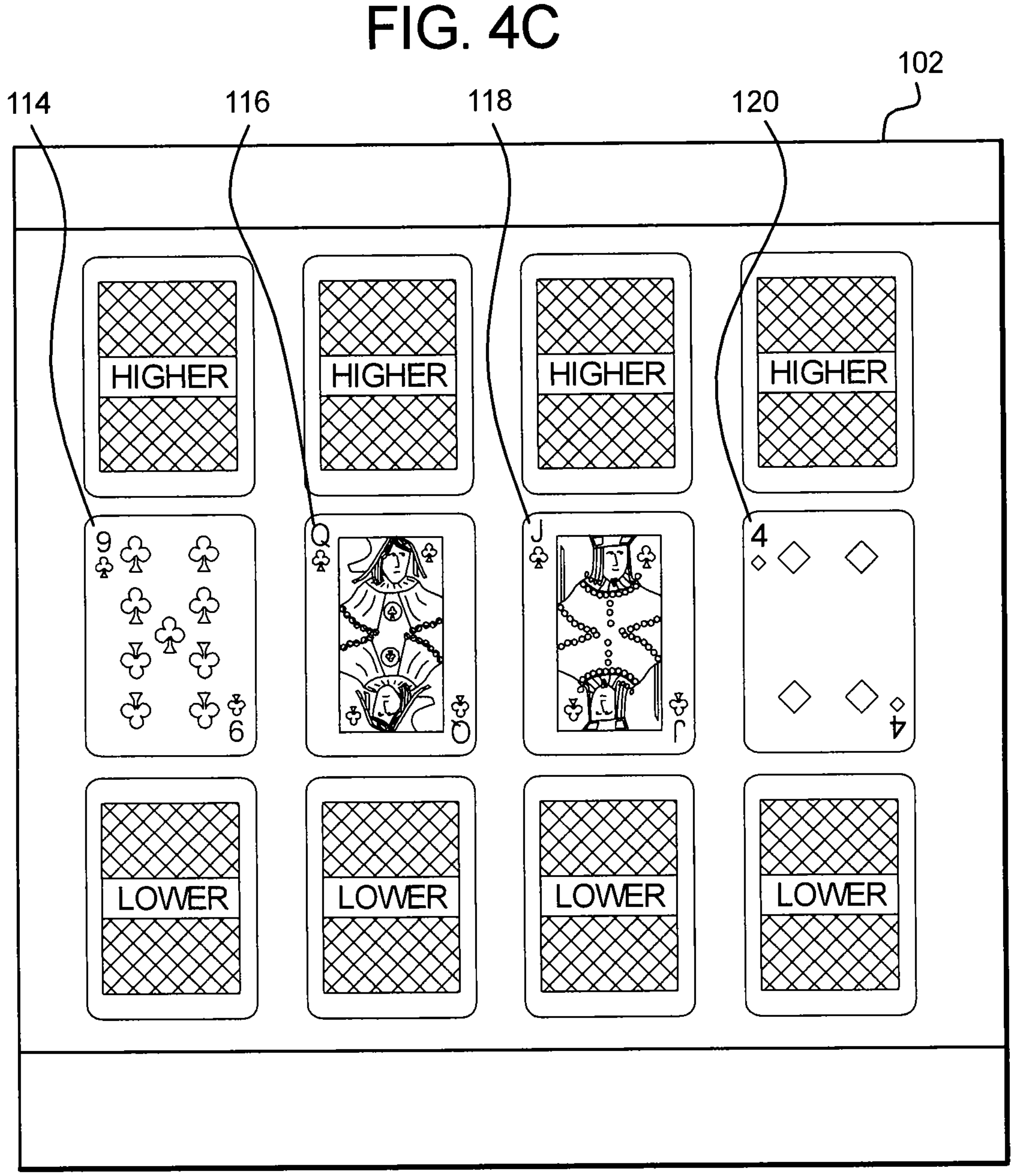

As illustrated in FIG. 4C, the gaming machine randomly selects a cards from all of the cards of a quantity equal to the number of cards selected to be played by the player. The display device displays four randomly selected cards in the middle of the display device 102 of the gaming machine. The gaming machine randomly generates the nine of clubs 114, the queen of clubs 116, the jack of clubs 118 and the four of diamonds 120. In this embodiment, the gaming machine instructs the player to select the card image above the wagered on card if the player thinks a next comparison card will be higher and to select the card image below the wagered on card if the player thinks a next comparison card will be of a lower value. Enabling a player make an input in an area above the card they are playing to indicate that they think the comparison card will be higher and enabling a player make an input in an area below the card they are playing to indicate that they think the comparison card will be lower is easy for the player to understand. This display and input format may reduce errors made by the player.

Figure 4D:
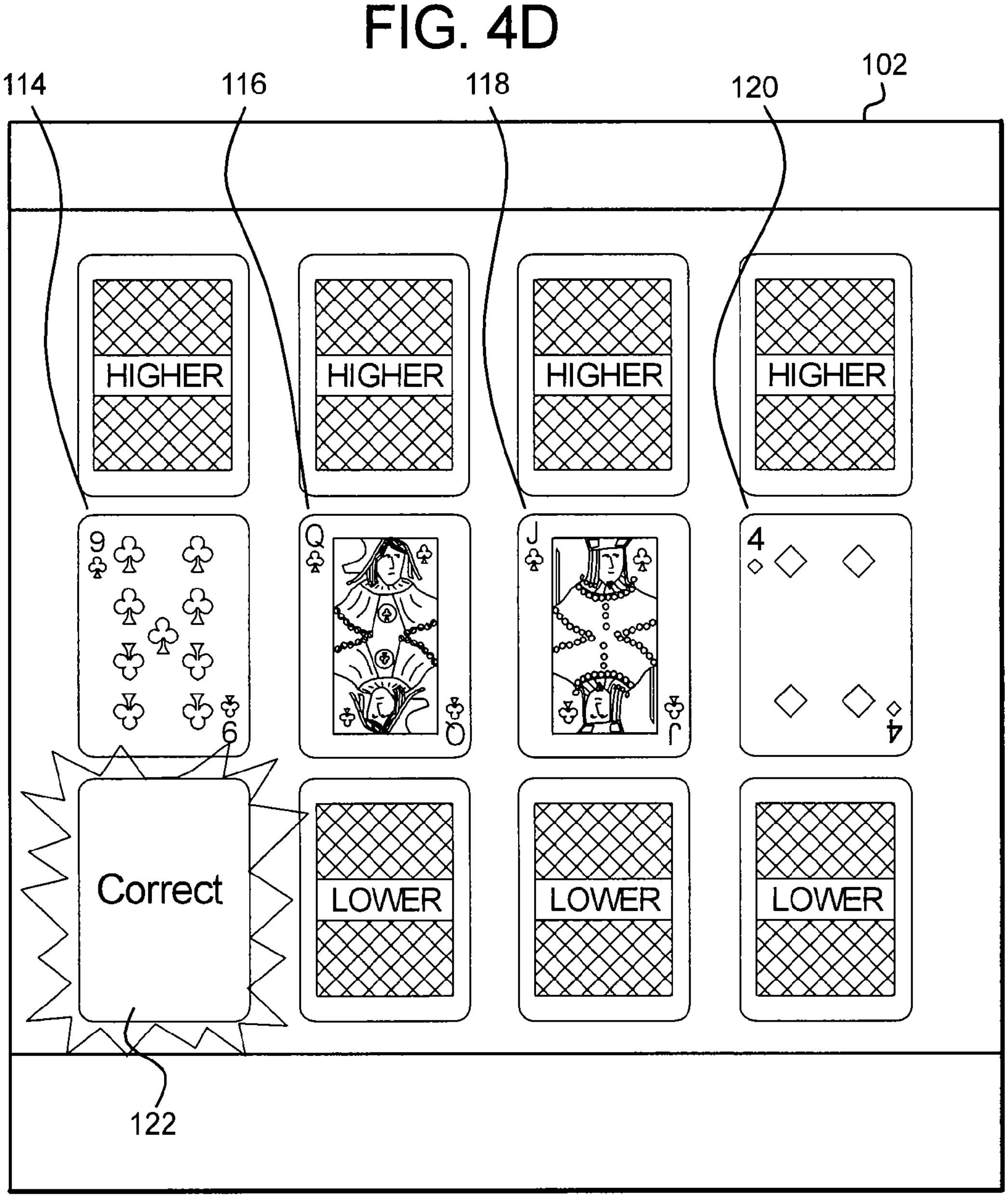
Figure 4E:
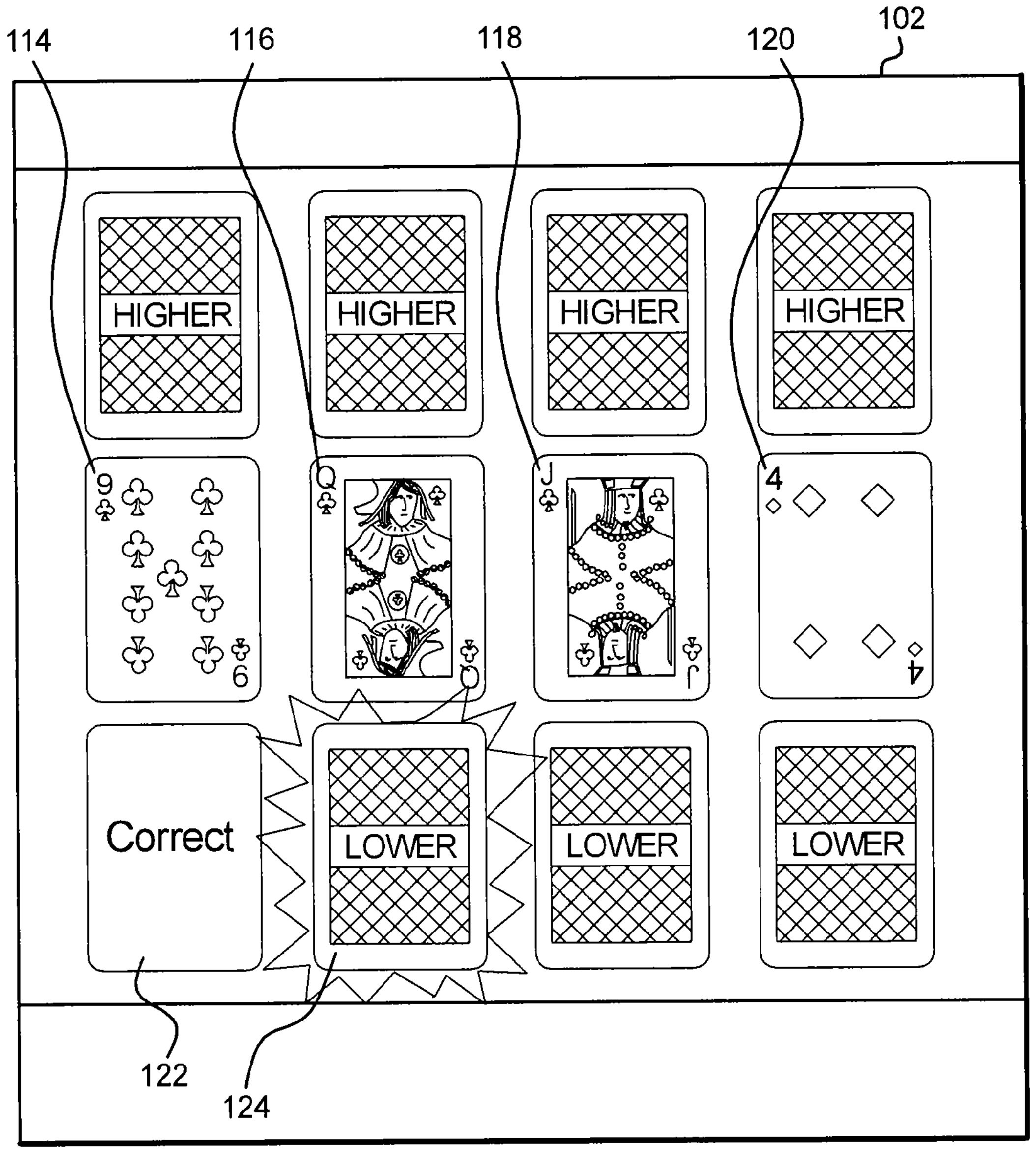

As illustrated in FIG. 4D, the player makes an input to select the card below 122 the nine of clubs 114 to indicate that the player thinks that a next comparison card will be lower in value. In this embodiment, the gaming machine does not display the comparison card to the player but informs the player if the player is correct or incorrect. As illustrated in FIG. 4E, the player is correct.

As illustrated in FIG. 4E, the player makes an input to select the card 124 below the queen of clubs 116 to indicate that the player thinks the value of a comparison card will be lower in value than a queen.

Figure 4F:
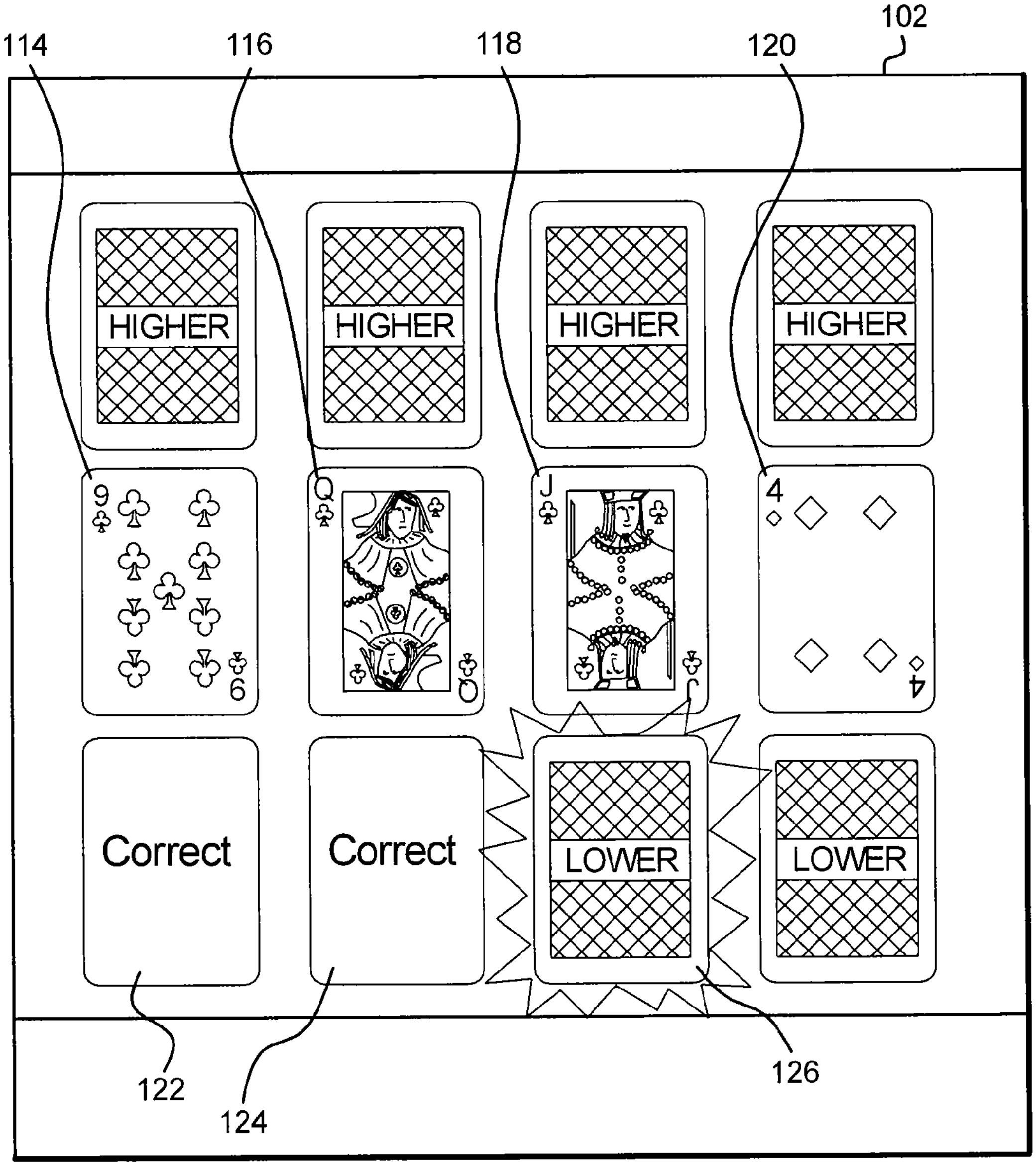
Figure 4G:
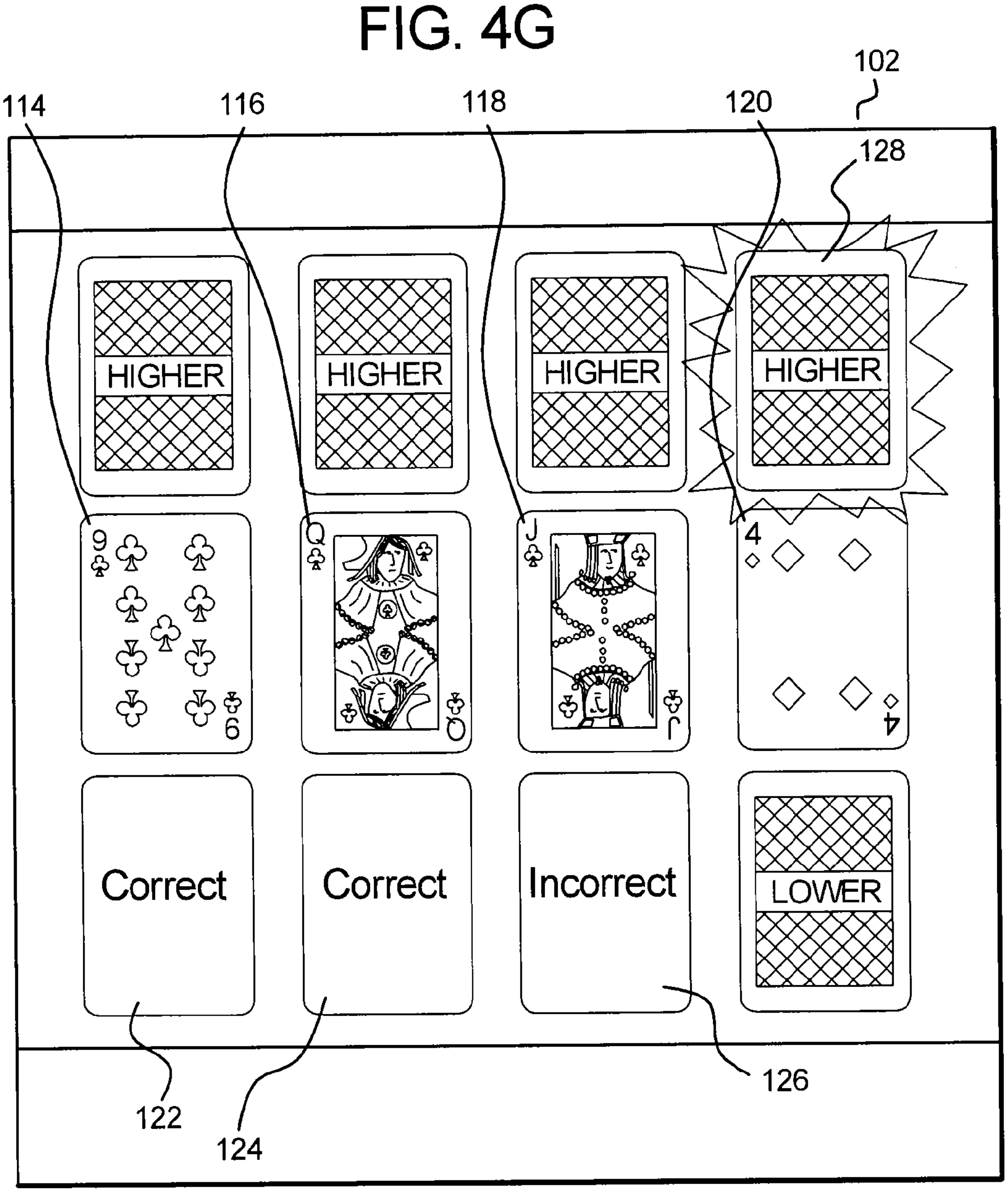
Figure 4H:
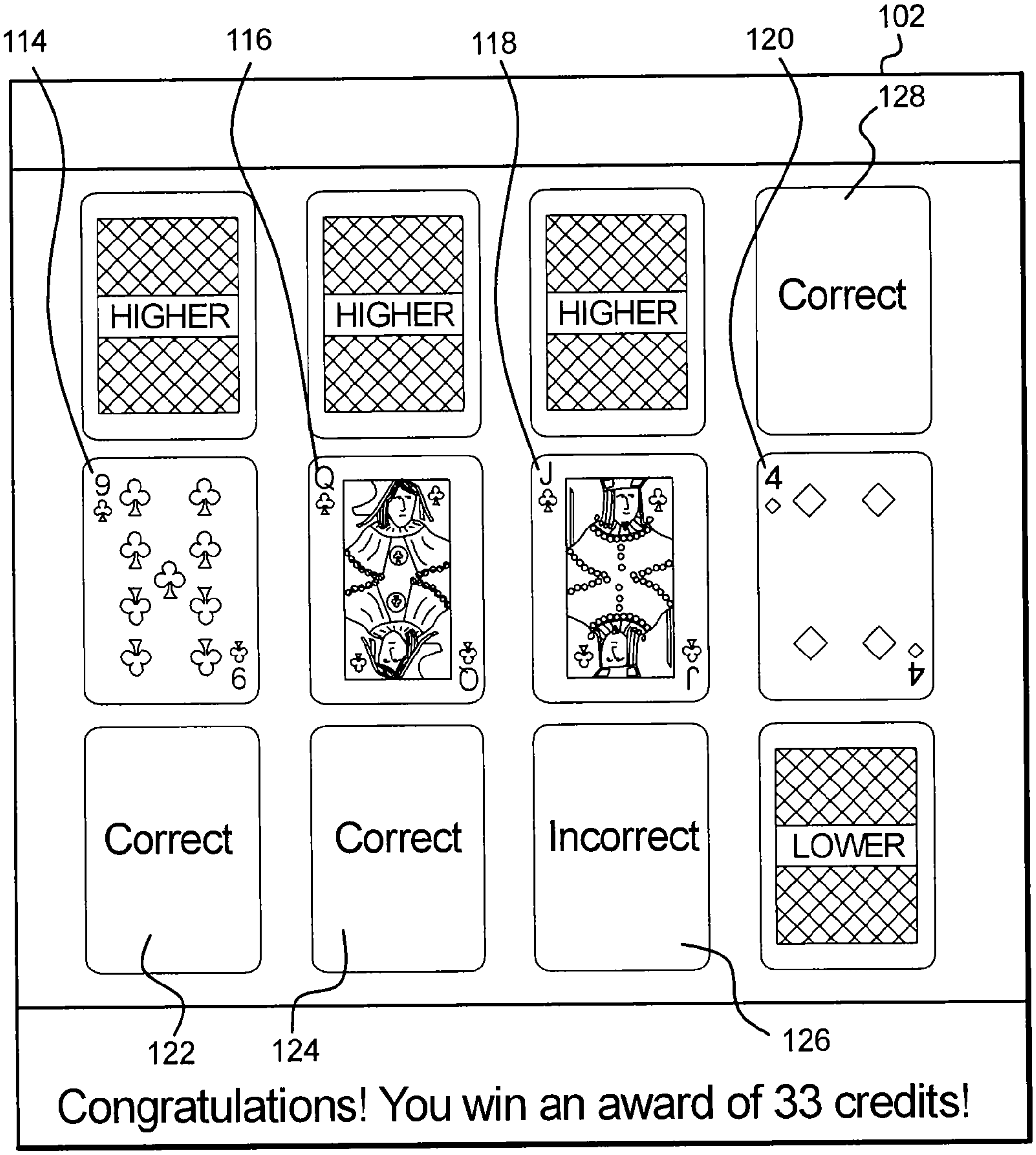

As illustrated in FIG. 4F, the player is correct. As illustrated in FIG. 4G, the player selects the card 126 below the jack of clubs to indicate that the player thinks a comparison card will be of a lower value than a jack. As illustrated in FIG. 4H, the player was not correct and the gaming machine informs the player that the player's input is incorrect. The player is correct two out of three times.

As illustrated in FIG. 4G, the player selects the card 128 above the four of diamonds 120 to indicate that the player thinks a comparison card value will be higher in value than a 4. As illustrated in FIG. 4H, the gaming machine indicates that the player is correct. The gaming machine indicates to the player that the player wins an award of 33 credits (11×3).

It should be appreciated that the gaming machine may inform the player of the outcome of each wagered on ranked symbol in any suitable manner. As illustrated in FIGS. 5A, 5B, 5C, 5D, 5E, 5F and 5G the gaming machine enables the player to view the comparison ranked symbol after making the input. It should be appreciated that the more cards the player views, the more player is able to control the amount of skill the player applies to the game. That is, a player may choose to remember cards already displayed to the player from the deck of cards so that the player increases the chances or probability of being correct. The player may use strategy to make guesses based off the cards already displayed, or the player may randomly guess higher or lower and choose not to use any strategy.

Figure 5A:
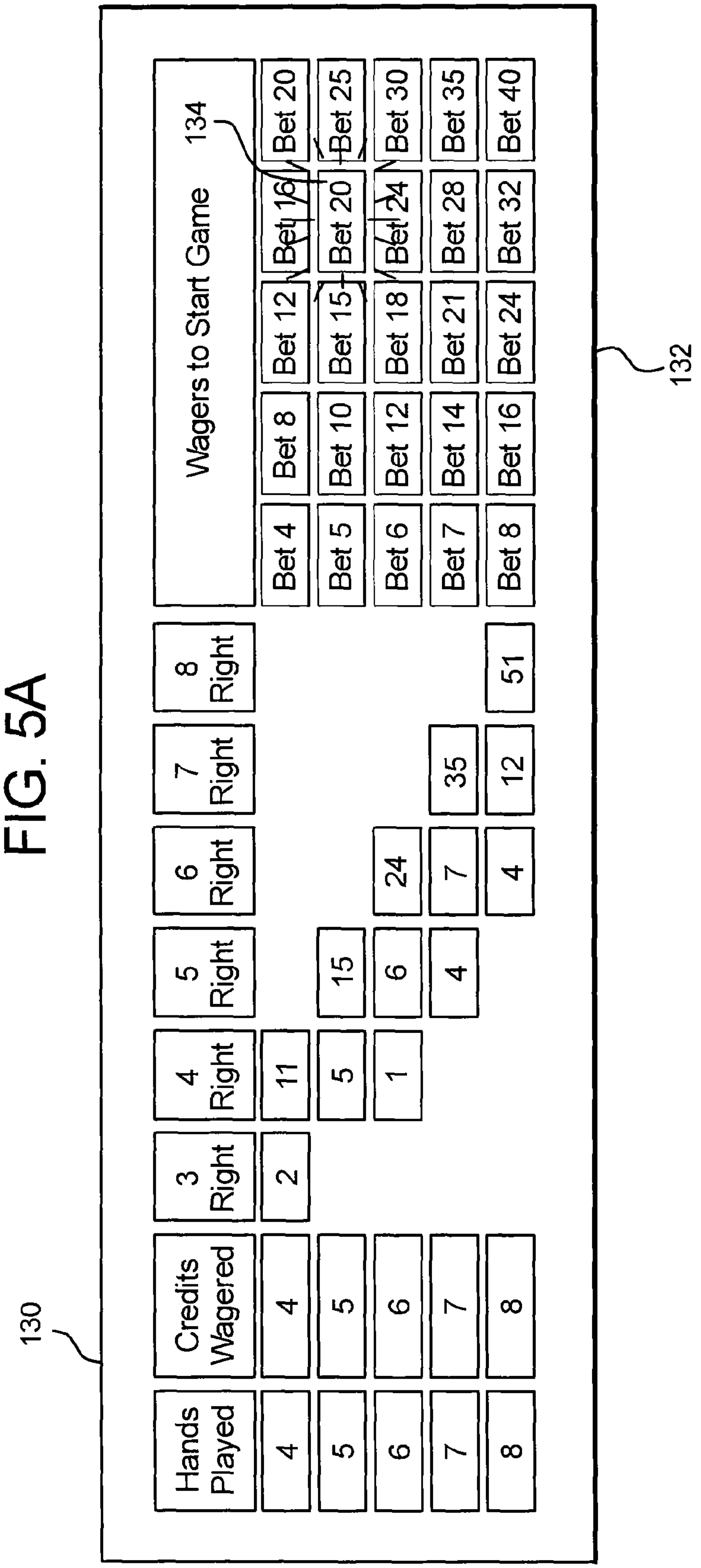
FIGS. 5A, 5B, 5C, 5D, 5E, 5F and 5G are enlarged views of a display device of a gaming machine the player to play one embodiment of the game of the present disclosure.

In one embodiment, a gaming device includes a display device that displays instructions for the player (not illustrated). The gaming machine enables the player to select a number of hands to play and to select a number of credits to wager per hand. It should be appreciated that the game may include any suitable number of hands the wagers may include any suitable amounts. As illustrated in FIG. 5A, the gaming machine displays a grid to the player and the player selects the "bet 20" button 134 to select to play five hands and wager 20 credits total or four credits per hand.

Figure 5B:
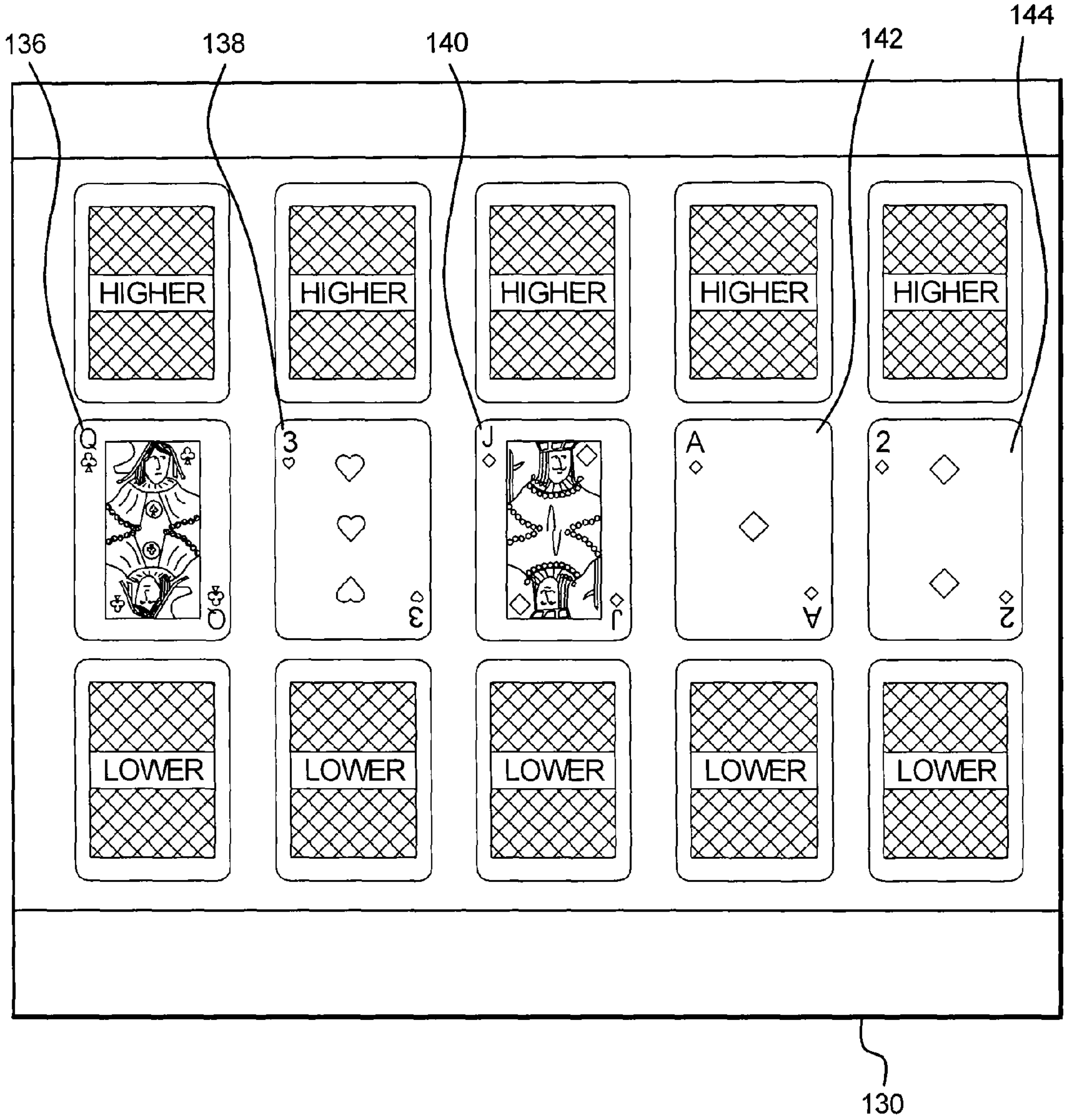

As illustrated in FIG. 5B, the gaming machine displays the number of selected ranked symbols or hands to the player on a display device 130. The symbols include a queen of clubs 136, a three of hearts 138, a jack of diamonds 140, an ace of diamonds 142 and a two of diamonds 144.

Figure 5C:
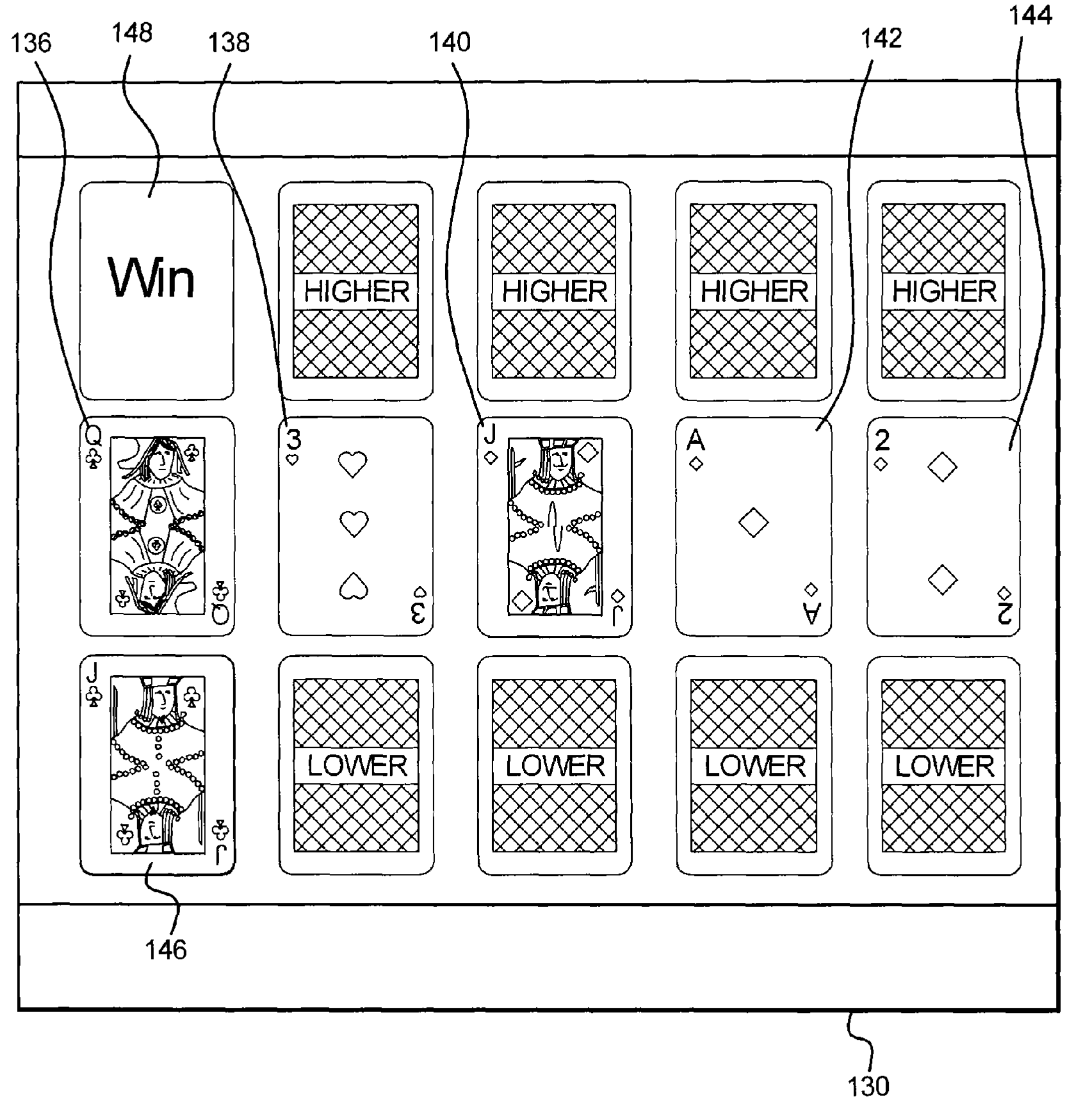

As illustrated in FIG. 5C, the gaming machine enables the player to make an input to predict or guess whether a comparison symbol is higher or lower in value than the queen 136. The player selects the card 146 below the queen of clubs to indicate that the player believes that the comparison value will be lower. In this embodiment, the gaming machine then displays the comparison symbol. For example, the gaming machine randomly generates a jack of clubs 146. In one embodiment, the gaming machine indicates in the non-selected area as a win.

Figure 5D:
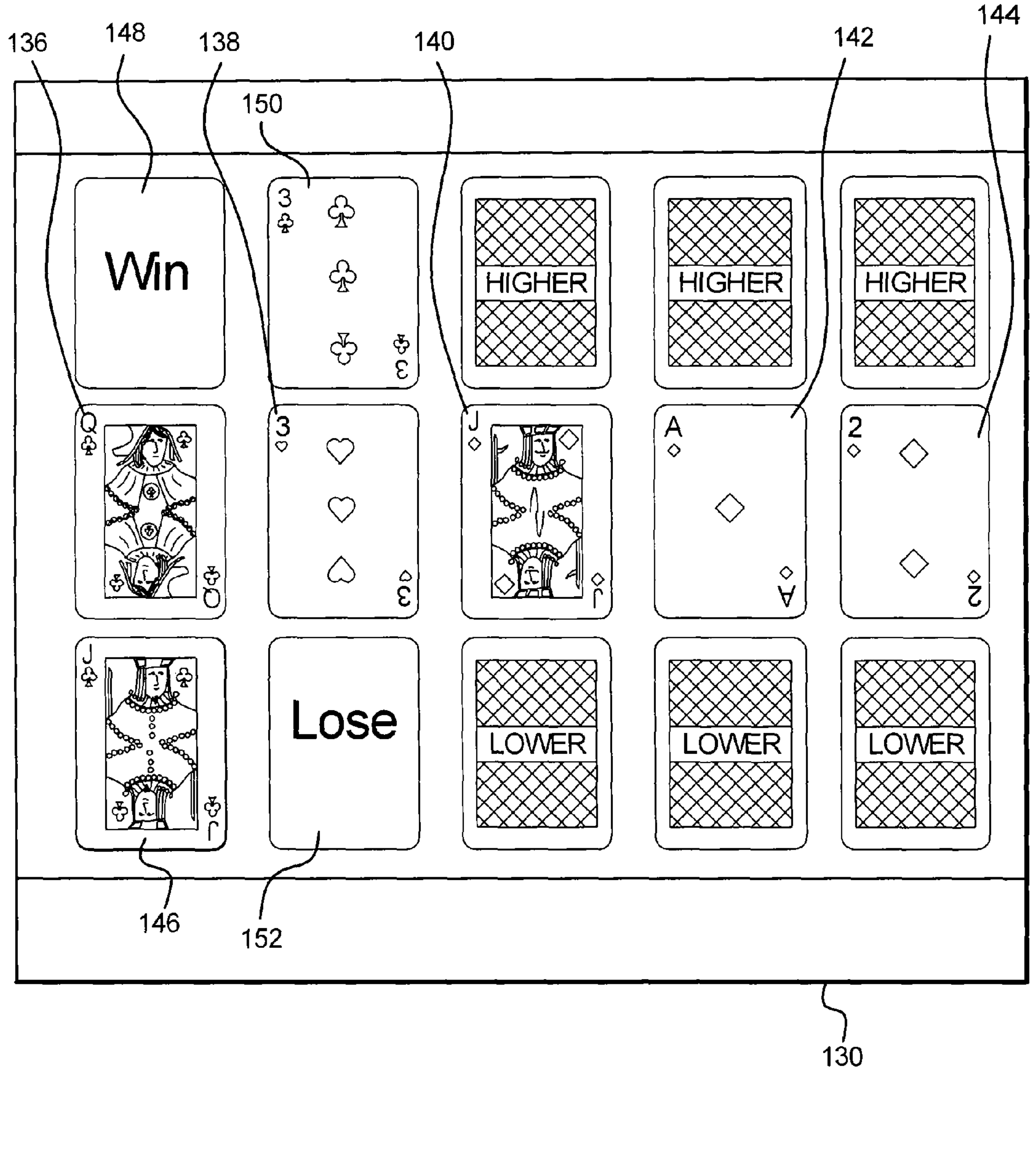

As illustrated in FIG. 5D, the player makes an input to indicate that the player thinks a comparison card will be higher in value than three. That is, the player selects the card 150 above the three of hearts to indicate that the comparison card is higher in value. The gaming machine randomly generates and displays a three of clubs. In this embodiment, if the comparison card is the same value as the initial card. In this embodiment, a card of a same value is considered an instant loss to the player. It should be appreciated that a same value may be an instant win for the player or a draw. As illustrated in FIG. 5D, the player loses 152.

Figure 5E:
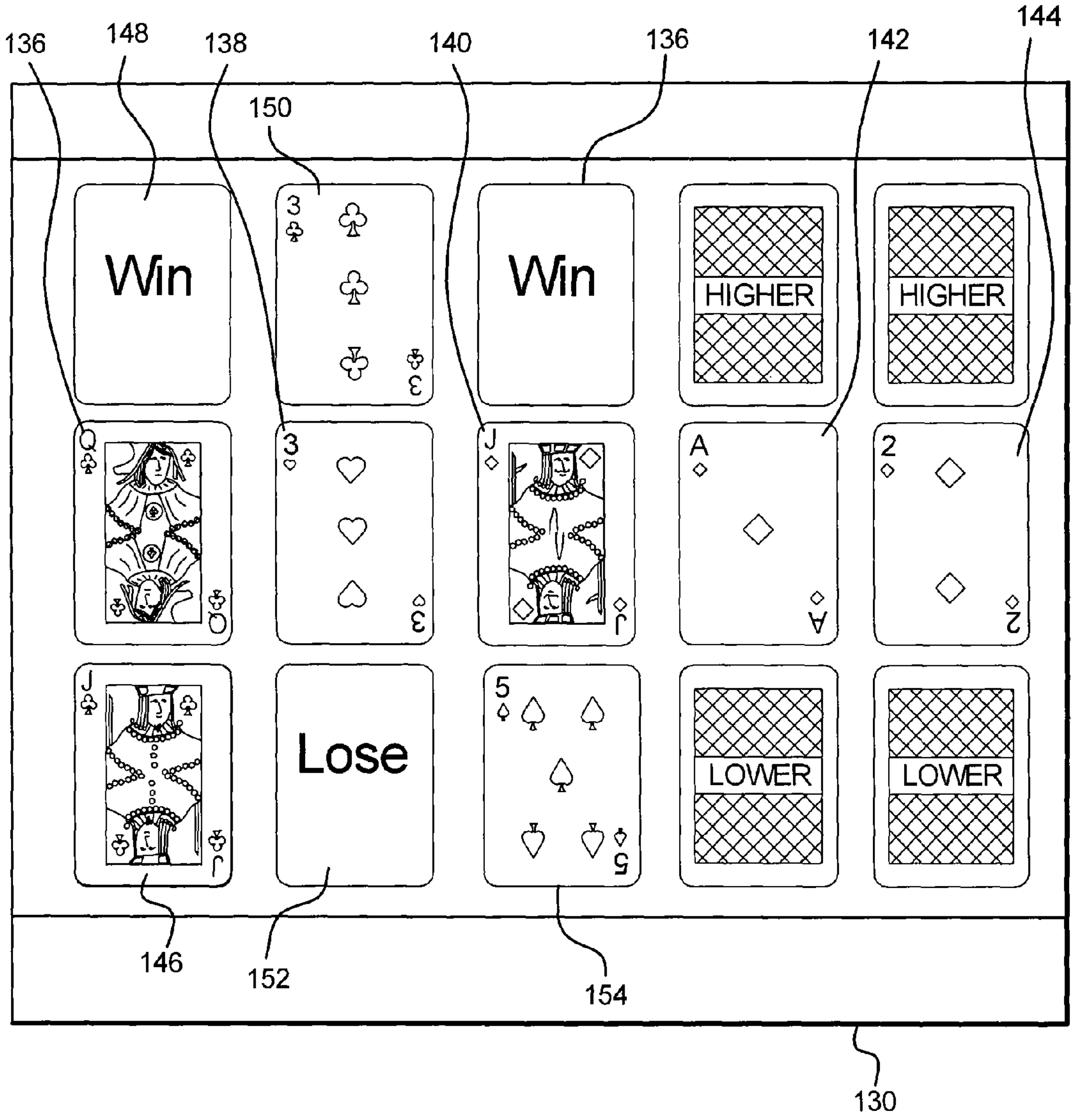
Figure 5F:
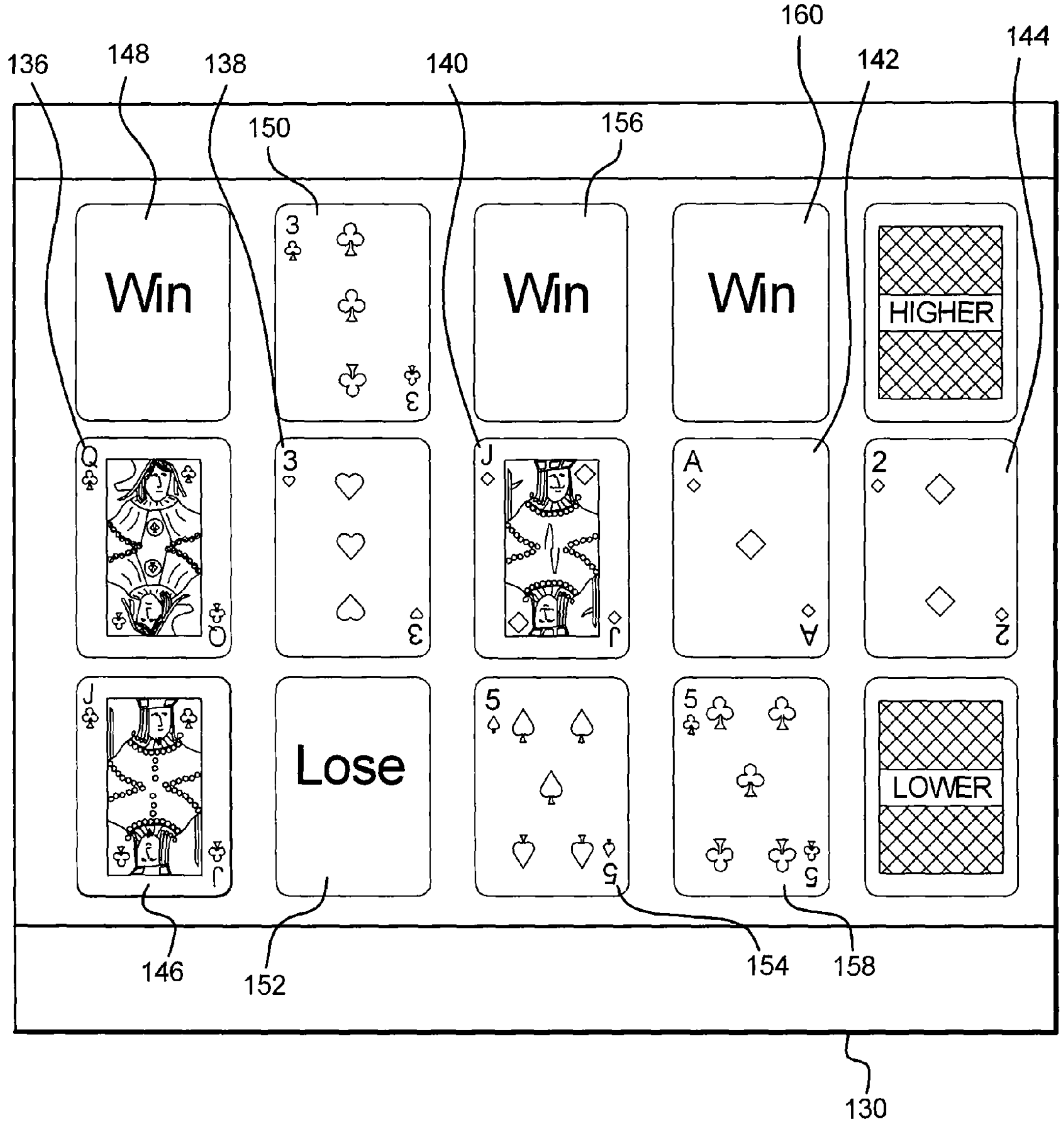

As illustrated in FIG. 5E, the player makes an input to indicate that the player thinks a comparison card will be lower in value than the jack. That is, the player selects the card 156 below the jack of diamonds to indicate that the player predicts the comparison card is ranked lower. The gaming machine randomly generates and displays a five of spades. As illustrated in FIG. 5F, the player wins 156.

Figure 5G:
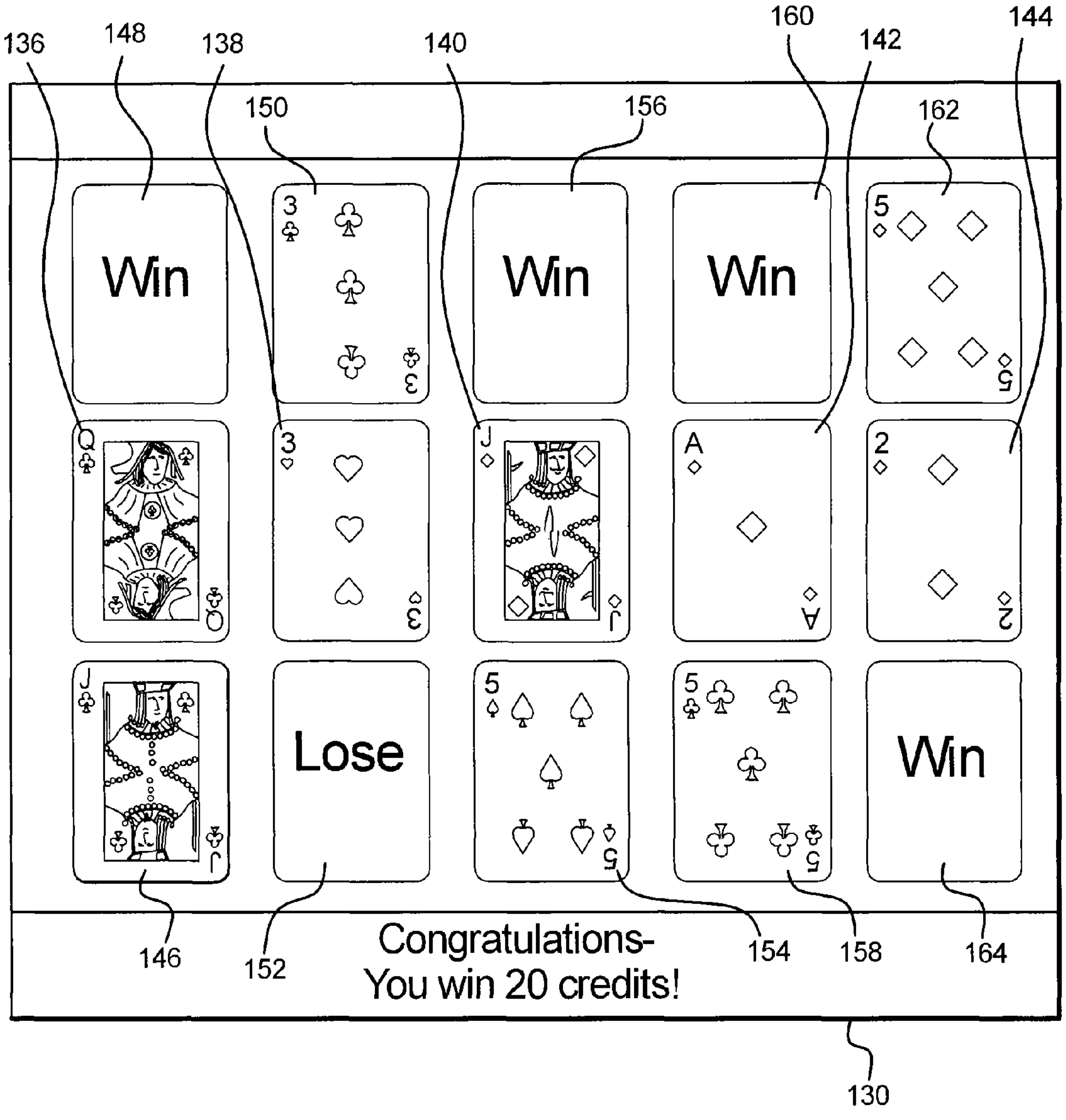

As illustrated in FIG. 5F, the player makes an input to indicate that the player thinks a comparison card will be lower in value than the ace 142. That is, the player selects the card 158 below the ace of diamonds 142 to indicate that the player predicts the comparison card is ranked lower. The gaming machine randomly generates and displays a five of clubs. As illustrated in FIG. 5G, the player wins 160.

As illustrated in FIG. 5G, the player makes an input to indicate that the player thinks a comparison card will be higher in value than the two of diamonds 144. That is, the player selects the card 162 above the two of diamonds 144 to indicate that the player predicts the comparison card is ranked higher. The gaming machine randomly generates and displays a five of diamonds. As illustrated in FIG. 5G, the player wins 164.

The game ends because the player played the total number of wagered on hands or cards. As illustrated in FIG. 5G, the player wins 20 credits. The gaming machine multiplies the base win of five and multiplies it by the amount wagered per card (4×5).

It should be appreciated that the paytable may be any suitable paytable. In one embodiment, the gaming machine requires to a player wager a same number of credits on each ranked symbol or hand. In another embodiment, the gaming machine enables the player to select to wager a total amount. For example, instead of having different wagering amounts per number of hands, the gaming machine enables the player to select a number of hands, such as 3 hands, 5 hands, 7 hands or 9 hands then select a total wager amount such as 2 credits, 4 credits, 6 credits or 8 credits.

It should be appreciated that the paytable may increase in any suitable manner. In one embodiment, the paytable increases exponentially or greatly after a certain number of correct inputs. In this embodiment, the player has a chance to win higher awards. In one such embodiment, the number of correct inputs required for a win is dependent on the number of symbols wagered on by the player or the number of inputs wagered on by the player. In another embodiment, the paytable increases stepwise. That is, each time a player makes a correct input, after a certain number of inputs, the player gets paid a certain amount.

It should be appreciated that the gaming machine may determine the award to provide the player in any suitable manner. In one embodiment, the award is determined by the total number of correct answers for the player and based on the total number of symbols wagered on by the player, as discussed above. That is, if the player makes a predetermined number of correct answers. The player receives an award. The predetermined number of correct answers is based on the number of symbols selected and wagered on by the player. In an alternative embodiment, the award is based on each correct answer. For example, a player wins a certain amount for each correct answer.

It should be appreciated that the high-low game of the present disclosure may be implemented in a primary or secondary game. Additionally, the high-low game may be implemented on a gaming table. That is, instead of playing the game at a gaming device, a player may play the game against a dealer at a live gaming table.

It should be appreciated that the symbols may be ranked in any suitable manner. The symbols are ranked higher, lower, or equal to the other symbols in a set of symbols. In at least one embodiment, if the wagered on symbol and the comparison symbol are of an equal rank, the comparison is a losing comparison. It should be appreciated that if the symbols are ranked equally, the comparison could also be evaluated as a winning comparison. In another embodiment, the symbols are ranked equally the comparison is considered a draw.

The symbols may be any suitable type of symbol. In one embodiment, the symbols are numbers. In another embodiment, the symbols are letters. In another embodiment, the symbols include multiple rankings such a number and a letter. In another embodiment, the symbols are days of the week or months of the year.

The gaming machine may include any suitable inputs for the high and low indicators. The player selectable high and low prediction indicators enable the player to choose whether the wagered on symbol has a higher or lower rank than the comparison symbol. In one embodiment, one high and one low prediction indicator is displayed for wagered on symbol. It should be appreciated that one high and one low prediction indicator can be used for a plurality of predictions.

It should be appreciated that the gaming machine may indicate which symbol the player is playing in any suitable manner. In one embodiment, the gaming machine highlights or indicates symbol to the player. In another embodiment, the player makes an input to select one of the displayed symbols to input a prediction. In one embodiment, the symbols are from a limited set of symbols and cannot be used again. In one embodiment, the player may select the order of symbols to play as part of a strategy to win the game. For example, the player may select a very high or very low symbol to play first because they are more likely to make a correct input because the odds are in the player's favor. In one such embodiment, the comparison symbol is displayed and therefore the player views another symbol from the limited set of symbols. The player may choose to use this information to have a better probability of correctly guessing.

It should be appreciated that the comparison symbols may be displayed in any suitable manner. In one embodiment, the comparison symbols are not displayed. In another embodiment, the comparison symbols are displayed after the player inputs. In another embodiment, the gaming machine enables the player to determine whether or not to display the comparison symbols after the player inputs.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming device comprising:

at least one input device;

at least one display device;

at least one processor; and at least one memory device which stores a plurality of instructions, which when executed by the at least one processor, cause the at least one processor to operate with the at least one input device and the at least one display device to: provide a game operable upon a wager by a player and controlled by the at least one processor, provide a plurality of ranked symbols in the game, and for a play of the game to:

(a) enable the player to select a number of the ranked symbols to play in the play of the game, said number being at least two and less than a maximum number;

(b) thereafter, randomly select a quantity of the ranked symbols equal to the number of ranked symbols selected to be played by the player from all of the ranked symbols;

(c) display each of the selected quantity of ranked symbols;

(d) thereafter, for each of the displayed ranked symbols:

(i) enable the player to make an input to indicate whether a comparison symbol will be ranked higher or lower than said displayed ranked symbol, wherein each of the plurality of provided ranked symbols in the game are selected or generated only once for the play of the game such that the number of ranked symbols selected by the player can change a probability of the player making a correct input;

(ii) randomly generate said comparison symbol for said displayed ranked symbol;

(iii) determine if said comparison symbol is ranked higher or lower than said displayed ranked symbol; and (iv) determine if the player's input was correct;

(e) determine a number of correct inputs made by the player; and (f) provide an award to the player based upon the number of correct inputs made, wherein an amount of the award provided to the player is based upon whether the number of correct inputs made equals one of a plurality of predetermined numbers of correct inputs associated with the number of ranked symbols selected and a first number of ranked symbols selected is associated with a first quantity of predetermined numbers of correct inputs and a second, different number of ranked symbols selected is associated with a second, different quantity of predetermined numbers of correct inputs.

2. The gaming device of claim 1, wherein the ranked symbols are numbers.

3. The gaming device of claim 1, wherein the ranked symbols are associated with cards.

4. The gaming device of claim 1, wherein when executed by the at least one processor, the plurality of instructions cause the at least one processor to operate with the at least one display device and the at least one input device for the play of the game to display each of the selected quantity of ranked symbols sequentially.

5. The gaming device of claim 1, wherein when executed by the at least one processor, the plurality of instructions cause the at least one processor to operate with the at least one display device and the at least one input device for the play of the game to display each of the selected quantity of ranked symbols simultaneously.

6. The gaming device of claim 1, wherein when executed by the at least one processor, the plurality of instructions cause the at least one processor to operate with the at least one display device and the at least one input device for the play of the game to display the comparison symbols.

7. The gaming device of claim 1, wherein when executed by the at least one processor, the plurality of instructions cause the at least one processor to operate with the at least one display device and the at least one input device for the play of the game to enable the player to make the input to indicate whether said comparison symbol will be ranked higher or lower than said displayed ranked symbol before the generation of the comparison symbol.

8. The gaming device of claim 1, wherein when executed by the at least one processor, the plurality of instructions cause the at least one processor to operate with the at least one display device and the at least one input device for the play of the game to enable the player to make the input to indicate whether said comparison symbol will be ranked higher or lower than said displayed ranked symbol after the generation of the comparison symbol.

9. A gaming device comprising:

at least one input device;

at least one display device;

at least one processor; and at least one memory device which stores a plurality of instructions, which when executed by the at least one processor, cause the at least one processor to operate with the at least one input device and the at least one display device to: provide a game operable upon a wager by a player and controlled by the at least one processor, provide a plurality of cards in the game, wherein each card includes a value, and for a play of the game to:

(a) enable the player to select a number of the cards to play in the play of the game, said number being at least two and less than a maximum number;

(b) randomly select a quantity of the cards equal to the number of cards selected to be played from all of the cards;

(c) display each of the selected quantity of cards to the player;

(d) thereafter, for each of the selected displayed quantity of cards:

(i) enable the player to make an input to indicate whether the value of a comparison card will be ranked higher or lower than the value of the displayed card, wherein each of the plurality of cards in the game are selected or generated only once for the play of the game such that the number of cards selected by the player can change a probability of the player making a correct input;

(ii) randomly generate the comparison card for said displayed card;

(iii) determine if said comparison card value is ranked higher or lower than said value of the displayed card; and (iv) determine if the player's input was correct;

(e) determine a number of correct inputs made by the player; and (f) provide an award to the player based upon the number of correct inputs made, wherein an amount of the award provided to the player is based upon whether the number of correct inputs made equals one of a plurality of predetermined numbers of correct inputs associated with the number of cards selected and a first number of cards selected is associated with a first quantity of predetermined numbers of correct inputs and a second, different number of cards selected is associated with a second, different quantity of predetermined numbers of correct inputs.

10. The gaming device of claim 9, wherein when executed by the at least one processor, the plurality of instructions cause the at least one processor programmed to operate with the at least one display device and the at least one input device for the play of the game to display each of the selected quantity of cards sequentially.

11. The gaming device of claim 9, wherein when executed by the at least one processor, the plurality of instructions cause the at least one processor to operate with the at least one display device and the at least one input device for the play of the game to display each of the selected quantity of cards simultaneously.

12. The gaming device of claim 9, wherein when executed by the at least one processor, the plurality of instructions cause the at least one processor to operate with the at least one display device and the at least one input device for the play of the game to enable the player to make the input to indicate whether said comparison card value will be ranked higher or lower than the value of said displayed card before the generation of the comparison card.

13. The gaming device of claim 9, wherein when executed by the at least one processor, the plurality of instructions cause the at least one processor to operate with the at least one display device and the at least one input device for the play of the game to enable the player to make the input to indicate whether said comparison card value will be ranked higher or lower than the value of said displayed ranked card after the generation of the comparison card.

14. The gaming device of claim 9, wherein when executed by the at least one processor, the plurality of instructions cause the at least one processor to operate with the at least one display device and the at least one input device for the play of the game to display said comparison cards.

15. A method of operating a gaming device, said method comprising:

(a) causing at least one display device to display a selection screen of a game, the selection screen displaying a plurality of different numbers of ranked symbols selectable by a player;

(b) upon placement of a wager by the player for a play of the game, enabling the player to use at least one input device to select a number of the ranked symbols from the plurality of different numbers of ranked symbols to play in the play of the game;

(c) randomly selecting a quantity of the ranked symbols equal to the number of ranked symbols selected to be played by the player from all of the ranked symbols;

(d) causing the at least one display device to display each of the selected quantity of ranked symbols;

(e) thereafter, for each of the displayed ranked symbols:

(i) enabling the player to make an input via the at least one input device to indicate whether a comparison symbol will be ranked higher or lower than said displayed ranked symbol, wherein each of the plurality of ranked symbols in the game are configured to be selected or generated only once for the play of the game such that the number of ranked symbols selected by the player can change a probability of the player making a correct input;

(ii) randomly generating said comparison symbol for said displayed ranked symbol;

(iii) determining if said comparison symbol is ranked higher or lower than said displayed ranked symbol; and (iv) determining if the player's input was correct;

(f) determining a number of correct inputs made by the player; and (g) providing an award to the player based upon the number of correct inputs made, wherein an amount of the award provided to the player is based upon whether the number of correct inputs made equals one of a plurality of predetermined numbers of correct inputs associated with the number of ranked symbols selected and a first number of ranked symbols selected is associated with a first quantity of predetermined numbers of correct inputs and a second, different number of ranked symbols selected is associated with a second, different quantity of predetermined numbers of correct inputs.

16. The method of claim 15, wherein the ranked symbols are numbers.

17. The method of claim 15, wherein the ranked symbols are associated with cards.

18. The method of claim 15, which includes causing the at least one display device to display each of the selected quantity of ranked symbols sequentially in the play of the game.

19. The method of claim 15, which includes causing the at least one display device to display each of the selected quantity of ranked symbols simultaneously in the play of the game.

20. The method of claim 15, which includes causing the at least one display device to display the comparison symbols.

21. The method of claim 15, which includes enabling the player to make the input via the at least one input device to indicate whether said comparison symbol will be ranked higher or lower than said displayed ranked symbol before generating the comparison symbol.

22. The method of claim 15, which includes enabling the player to make the input to indicate whether said comparison symbol will be ranked higher or lower than said displayed ranked symbol after generating the comparison symbol.

23. The method of claim 15, wherein the method is provided through a data network.

24. The method of claim 23, wherein the data network is an internet.

25. A method of operating a gaming device, said method comprising:

(a) causing at least one display device to display a selection screen of a game, the selection screen displaying a plurality of different numbers of cards selectable by a player;

(b) upon placement of a wager by the player for a play of the game, enabling the player to use at least one input device to select a number of cards from the plurality of different numbers of cards to play in the play of the game, said number being at least two and less than a maximum number;

(c) randomly selecting a quantity of the cards from a plurality of cards equal to the number of cards selected to be played from all of the cards, each card of said plurality of cards including a value;

(d) causing the at least one display device to display each of the selected quantity of cards;

(e) thereafter, for each of the selected displayed quantity of cards:

(i) enabling the player to make an input via the at least one input device to indicate whether the value of a comparison card will be ranked higher or lower than the value of the displayed card, wherein each of the plurality of cards in the game are selected or generated only once for the play of the game such that the number of cards selected by the player can change a probability of the player making a correct input;

(ii) randomly generating the comparison card from the plurality of cards;

(iii) determining if said comparison card value is ranked higher or lower than said value of the displayed card; and (iv) determining if the player's input was correct;

(f) determining a number of correct inputs made by the player; and (g) providing an award to the player based upon the number of correct inputs made, wherein an amount of the award provided to the player is based upon whether the number of correct inputs made equals one of a plurality of predetermined numbers of correct inputs associated with the number of cards selected and a first number of cards selected is associated with a first quantity of predetermined numbers of correct inputs and a second, different number of cards selected is associated with a second, different quantity of predetermined numbers of correct inputs.

26. The method of claim 25, which includes causing the at least one display device to display each of the selected quantity of cards sequentially in the play of the game.

27. The method of claim 25, which includes causing the at least one display device to display each of the selected quantity of cards simultaneously in the play of the game.

28. The method of claim 25, which includes enabling the player to make the input via the at least one input device to indicate whether said comparison card value will be ranked higher or lower than the value of said displayed card before generating the comparison card.

29. The method of claim 25, which includes enabling the player to make the input to indicate whether said comparison card value will be ranked higher or lower than the value of said displayed ranked card after generating the comparison card.

30. The method of claim 25, which includes causing the at least one display device to display said comparison cards.

31. The method of claim 25, wherein the method is provided through a data network.

32. The method of claim 31, wherein the data network is an internet.

* * * * *

UNITED STATES PATENT AND TRADEMARK OFFICE

CERTIFICATE OF CORRECTION

PATENT NO. : 8,449,375 B2
APPLICATION NO. : 11/557848
DATED : May 28, 2013
INVENTOR(S) : Michael M. Oberberger It is certified that error appears in the above-identified patent and that said Letters Patent is hereby corrected as shown below:

IN THE CLAIMS

In Claim 1, Column 24, Line 60, delete “to”.
In Claim 1, Column 24, Line 61, delete the second instance of “the”.
In Claim 1, Column 25, Line 1, between “of” and “ranked” insert --the--.
In Claim 1, Column 25, Line 24, delete “and” and insert --,-- after “selected”.
In Claim 4, Column 25, Line 38, between “of” and “ranked” insert --the--.
In Claim 5, Column 25, Line 44, between “of” and “ranked” insert --the--.
In Claim 9, Column 26, Line 12, delete “to”.
In Claim 9, Column 26, Line 13, delete the second instance of “the”.
In Claim 9, Column 26, Line 19, between “of” and “cards” insert --the--.
In Claim 9, Column 26, Line 21, after the second instance of “of” insert --the--.
In Claim 9, Column 26, Line 45, delete “and” and insert --,-- after “selected”.
In Claim 10, Column 26, Line 53, delete “programmed”.
In Claim 10, Column 26, Line 56, between “of” and “cards” insert --the--.
In Claim 11, Column 26, Line 61, between “of” and “cards” insert --the--.
In Claim 15, Column 27, Line 26, delete the first instance of “the”.
In Claim 15, Column 27, Line 29, delete “the”.
In Claim 15, Column 27, Line 30, before “equal” insert --from a plurality of ranked symbols--.
In Claim 15, Column 27, Line 33, between “of” and “ranked” insert --the--.
In Claim 15, Column 27, Line 58, delete “and” and insert --,-- after “selected”.
In Claim 18, Column 28, Line 3, between “of” and “ranked” insert --the--.
In Claim 19, Column 28, Line 6, between “of” and “ranked” insert --the--.
In Claim 25, Column 28, Line 36, delete “the”.
In Claim 25, Column 28, Line 41, between “of” and “cards” insert --the--.
In Claim 25, Column 28, Line 42, after the second instance of “of” insert --the--.
In Claim 25, Column 28, Line 65, delete “and” and insert --,-- after “selected”.
In Claim 26, Column 29, Line 6, between “of” and “cards” insert --the--.
In Claim 27, Column 29, Line 9, between “of” and “cards” insert --the--.

Signed and Sealed this
Twenty-ninth Day of October, 2013

Teresa Stanek Rea
*Deputy Director of the United States Patent and Trademark Office*